(12) United States Patent
Jacobson et al.

(10) Patent No.: US 10,252,356 B2
(45) Date of Patent: Apr. 9, 2019

(54) DEMOLITION SHEAR AND DEMOLITION SHEAR PIERCING TIP INSERT AND NOSE CONFIGURATION

(71) Applicant: Genesis Attachments, LLC, Superior, WI (US)

(72) Inventors: Daniel P. Jacobson, Wrenshall, MN (US); Chad Wood, Duluth, MN (US); Daniel J. Raihala, Superior, WI (US); Steven T. Letko, Hermantown, MN (US)

(73) Assignee: Genesis Attachments, LLC, Superior, WI (US)

( * ) Notice: Subject to any disclaimer, the term of this patent is extended or adjusted under 35 U.S.C. 154(b) by 0 days.

(21) Appl. No.: 14/783,547

(22) PCT Filed: Apr. 9, 2013

(86) PCT No.: PCT/US2013/035816
§ 371 (c)(1),
(2) Date: Oct. 9, 2015

(87) PCT Pub. No.: WO2014/168611
PCT Pub. Date: Oct. 16, 2014

(65) Prior Publication Data
US 2016/0059328 A1    Mar. 3, 2016

(51) Int. Cl.
*B23D 35/00*     (2006.01)
*B23D 17/00*     (2006.01)

(52) U.S. Cl.
CPC ........... *B23D 35/001* (2013.01); *B23D 17/00* (2013.01)

(58) Field of Classification Search
CPC ....... B23D 17/00; B23D 35/00–35/002; B25F 3/00
USPC ......... 30/134.228, 379, 379.5; D15/123, 138
See application file for complete search history.

(56) References Cited

U.S. PATENT DOCUMENTS

| 4,104,792 A | 8/1978 | LaBounty |
| 4,188,721 A | 2/1980 | Ramun et al. |
| 4,198,747 A | 4/1980 | LaBounty |
| 4,403,431 A | 9/1983 | Ramun et al. |
| 4,543,719 A | 10/1985 | Pardoe |

(Continued)

FOREIGN PATENT DOCUMENTS

| DE | 29708705 U1 | 8/1997 |
| DE | 29715490 U1 | 1/1998 |

(Continued)

OTHER PUBLICATIONS

NZ First Examination Report issued by New Zealand Intellectual Property Office dated Jun. 27, 2018, Application No. 741470, 4 pages.

*Primary Examiner* — Jason Daniel Prone
(74) *Attorney, Agent, or Firm* — Thomas J. Oppold; Larkin Hoffman Daly & Lindgren, Ltd.

(57) ABSTRACT

A demolition shear and a piercing tip insert and nose configuration for a demolition shear which resists nose wear and resists retract forces exerted on the piercing tip insert in jamming situations and in the event of snagging of the piercing tip insert. The piercing tip insert includes first and second piercing tip halves, each half having an outer planar sidewall, a curved front wall extending laterally inward, and a bottom leg extending laterally inward defining a shearing edge and a piercing edge.

18 Claims, 23 Drawing Sheets

(56) References Cited

U.S. PATENT DOCUMENTS

| | | | |
|---|---|---|---|
| 4,558,515 A | 12/1985 | LaBounty | |
| 4,776,093 A * | 10/1988 | Gross | B23D 17/00 |
| | | | 30/134 |
| 4,897,921 A | 2/1990 | Ramun | |
| 5,146,683 A * | 9/1992 | Morikawa | B23D 17/00 |
| | | | 30/134 |
| 5,187,868 A | 2/1993 | Hall | |
| 5,339,525 A * | 8/1994 | Morikawa | B23D 17/00 |
| | | | 30/134 |
| 5,533,682 A | 7/1996 | de Gier et al. | |
| 5,873,168 A | 2/1999 | Johnson et al. | |
| 5,894,666 A | 4/1999 | Hrusch | |
| 5,940,971 A * | 8/1999 | Ramun | B23D 17/00 |
| | | | 30/134 |
| 5,992,023 A | 11/1999 | Sederberg et al. | |
| 6,061,911 A * | 5/2000 | LaBounty | B23D 17/00 |
| | | | 30/134 |
| 6,119,970 A | 9/2000 | LaBounty et al. | |
| 6,202,308 B1 * | 3/2001 | Ramun | B23D 17/00 |
| | | | 30/134 |
| 6,655,054 B1 | 12/2003 | Ward | |
| 6,839,969 B2 | 1/2005 | Jacobson et al. | |
| 6,926,217 B1 | 8/2005 | LaBounty et al. | |
| 7,216,575 B2 | 5/2007 | Alseth et al. | |
| 7,284,718 B2 * | 10/2007 | Christenson | E02F 3/965 |
| | | | 241/101.73 |
| 7,306,177 B2 * | 12/2007 | Ward | B23D 17/00 |
| | | | 30/134 |
| 7,487,930 B2 | 2/2009 | Sederberg et al. | |
| D602,509 S * | 10/2009 | van Gemert | D15/138 |
| D622,297 S * | 8/2010 | van Gemert | D15/138 |
| 7,895,755 B2 | 3/2011 | Jacobson et al. | |
| 8,146,256 B2 | 4/2012 | Johnson et al. | |
| 8,327,547 B2 | 12/2012 | Johnson et al. | |
| D687,077 S * | 7/2013 | Gerardus de Gier | D15/123 |
| D687,470 S * | 8/2013 | Gerardus de Gier | D15/123 |
| 8,650,759 B2 | 2/2014 | Johnson et al. | |
| RE45,341 E | 1/2015 | Jacobson et al. | |
| 9,132,490 B2 * | 9/2015 | Ramun | B23D 35/001 |
| | | | 30/134 |
| 9,333,570 B2 * | 5/2016 | Clemons | B23D 35/001 |
| | | | 30/134 |
| 2002/0011535 A1 | 1/2002 | Cook | |
| 2004/0093739 A1 | 5/2004 | Jacobson et al. | |
| 2005/0115076 A1 | 6/2005 | Jacobson et al. | |
| 2007/0130776 A1 | 6/2007 | Grant et al. | |
| 2008/0072434 A1 | 3/2008 | Clemons et al. | |
| 2011/0146469 A1 | 6/2011 | Purser | |
| 2011/0225829 A1 * | 9/2011 | Raihala | B23D 31/008 |
| | | | 30/134 |
| 2014/0317935 A1 * | 10/2014 | Clemons | B23D 17/00 |
| | | | 30/134 |
| 2014/0319257 A1 * | 10/2014 | Clemons | B23D 17/00 |
| | | | 241/266 |
| 2014/0331843 A1 * | 11/2014 | Hall | B23D 17/00 |
| | | | 83/694 |
| 2015/0225925 A1 * | 8/2015 | Jacobson | B23D 17/00 |
| | | | 30/134 |
| 2015/0308075 A1 * | 10/2015 | Christenson | B23D 17/00 |
| | | | 30/134 |
| 2015/0308076 A1 * | 10/2015 | Christenson | B23D 35/002 |
| | | | 30/134 |
| 2016/0001293 A1 * | 1/2016 | Raihala | B23D 17/00 |
| | | | 241/267 |
| 2016/0008816 A1 * | 1/2016 | Wood | E05F 15/53 |
| | | | 241/264 |
| 2016/0047460 A1 * | 2/2016 | Jacobson | B66C 1/427 |
| | | | 414/680 |
| 2016/0059328 A1 * | 3/2016 | Jacobson | B23D 17/00 |
| | | | 30/249 |
| 2016/0061230 A1 * | 3/2016 | Jacobson | E02F 3/3681 |
| | | | 60/487 |
| 2016/0348338 A1 * | 12/2016 | Christenson | B23D 35/001 |
| | | | 30/134 |
| 2016/0348339 A1 * | 12/2016 | Christenson | B23D 35/001 |
| | | | 30/134 |
| 2017/0036281 A1 * | 2/2017 | Christenson | B23D 35/001 |
| | | | 30/134 |

FOREIGN PATENT DOCUMENTS

| | | |
|---|---|---|
| EP | 0666131 A1 | 1/1995 |
| EP | 0768137 A1 | 4/1997 |
| EP | 1939362 A1 | 7/2008 |
| FR | 2822482 A1 | 9/2002 |
| JP | 01010827 A | 1/1989 |
| JP | 09195528 A | 7/1997 |
| WO | 0128687 A1 | 4/2001 |
| WO | 0168992 A1 | 9/2001 |
| WO | 2004013417 A1 | 2/2004 |

\* cited by examiner

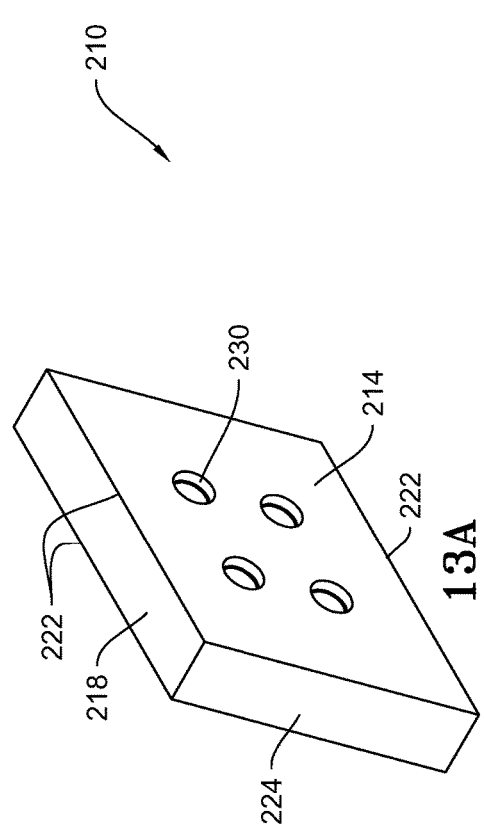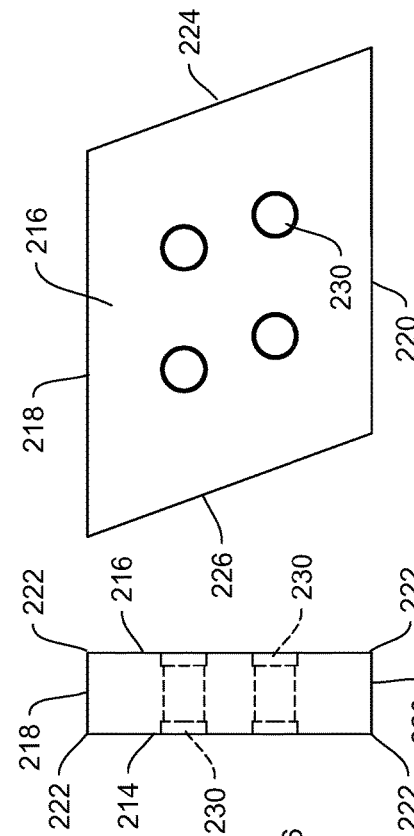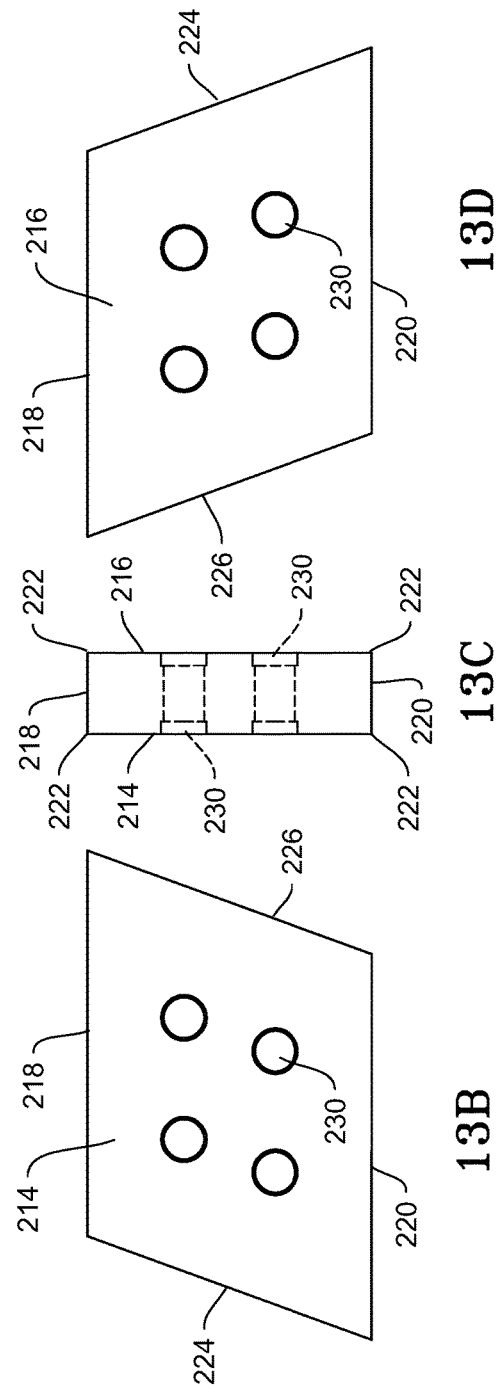
FIG. 13

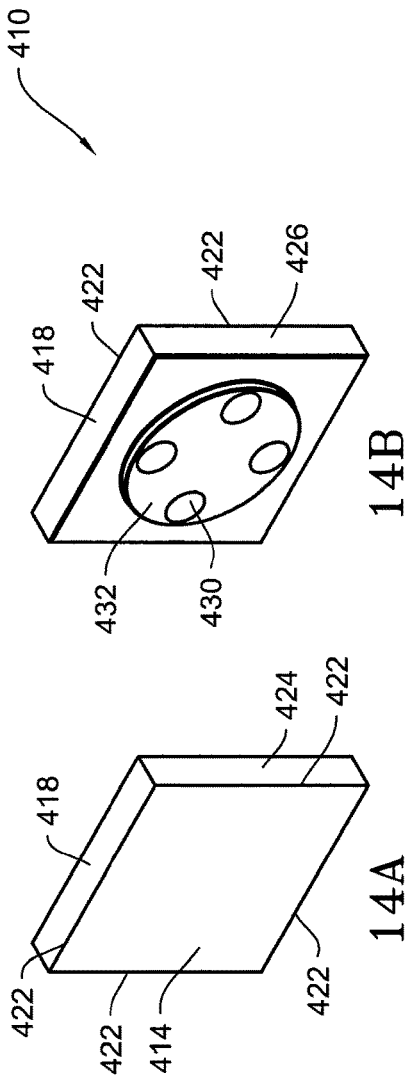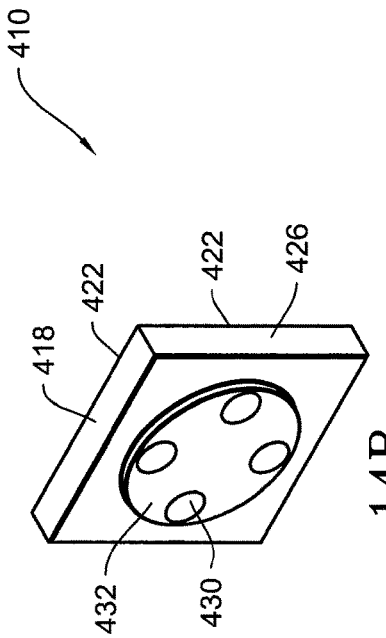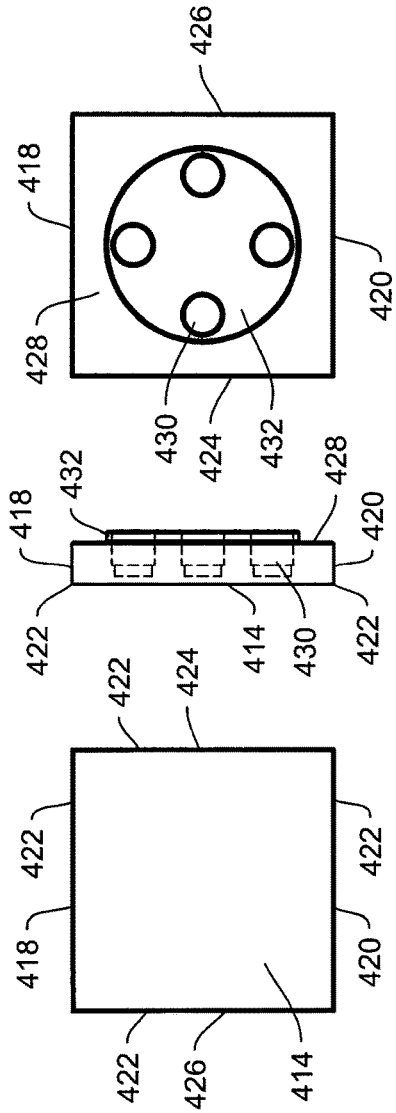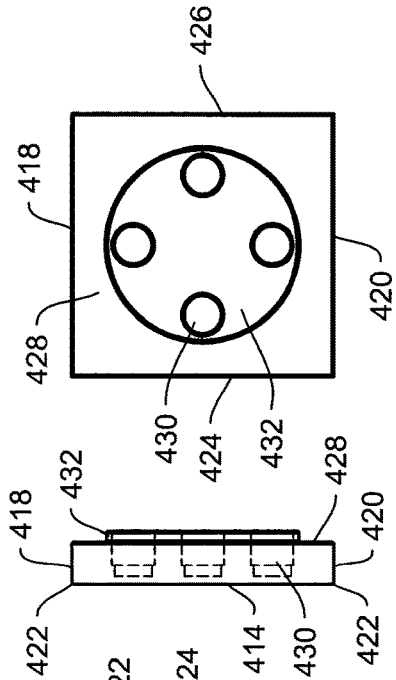
FIG. 14

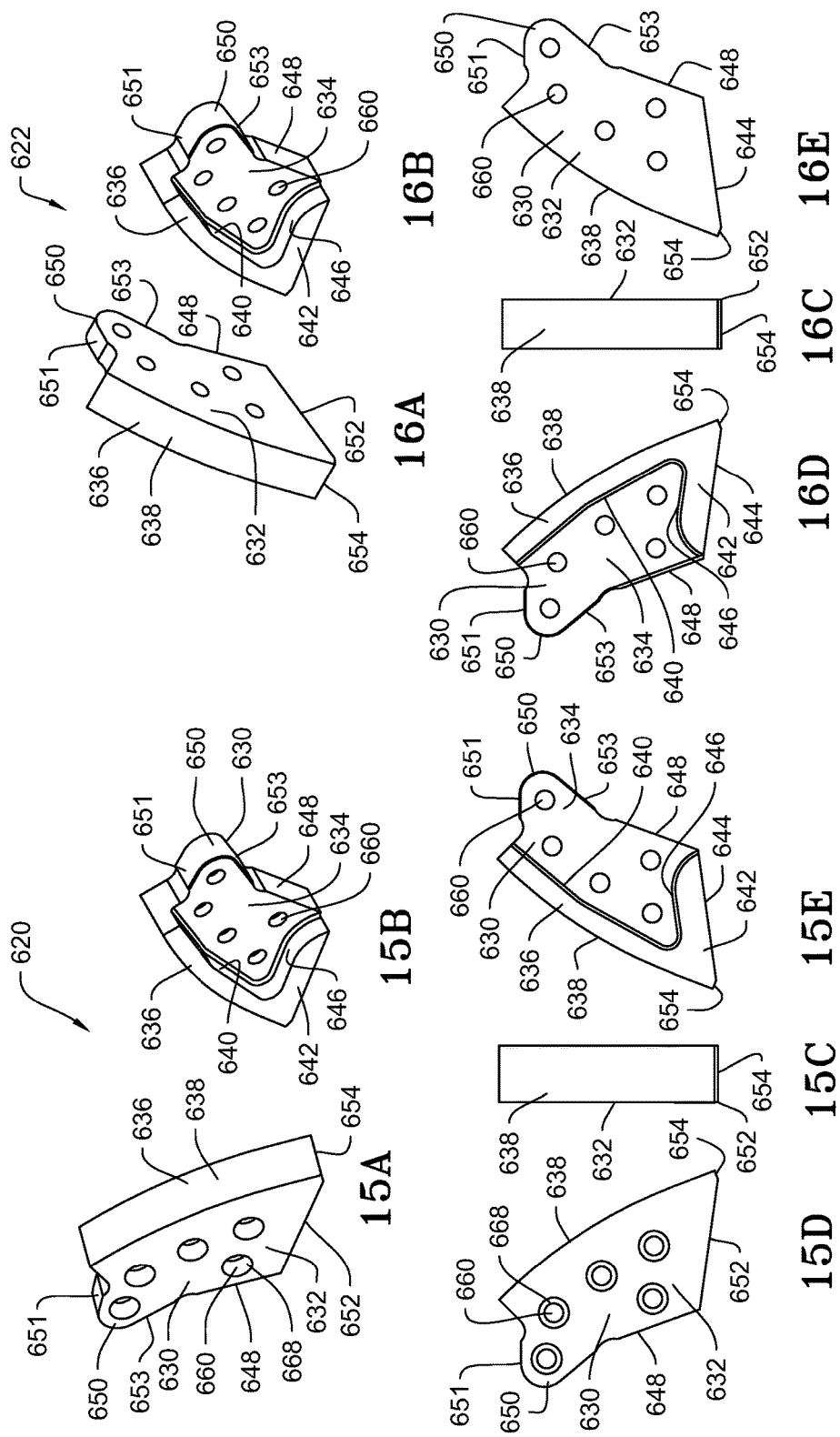

DEMOLITION SHEAR AND DEMOLITION SHEAR PIERCING TIP INSERT AND NOSE CONFIGURATION

BACKGROUND

There is a need for a demolition shear having a piercing tip insert and nose configuration to reduce nose wear and to resist retract forces exerted on the piercing tip insert in jamming situations and in the event of snagging of the piercing tip insert.

DESCRIPTION OF THE DRAWINGS

FIG. 13 shows different views of an embodiment of a guide blade insert, wherein 13A is a front perspective view, 13B is a front elevation view, 13C is an end elevation view and 13D is rear elevation view.

FIG. 14 shows different views of an embodiment of a cross-blade insert, wherein 14A is a front perspective view, 14B is a rear perspective view, 14C is an end elevation view, 14D is a front elevation view and 14E is rear elevation view.

FIG. 15 shows different views of an embodiment of a blade-side piercing tip half, wherein 15A is a front perspective view, 15B is a rear perspective view, 15C is a front end elevation view, 15D is an outer side elevation view and 15E is an inner side elevation view.

FIG. 16 shows different views of an embodiment of a guide-side piercing tip half, wherein 16A is a front perspective view, 16B is a rear perspective view, 16C is a front end elevation view, 16D is a inner side elevation view and 16E is outer side elevation view.

DESCRIPTION

Figure 1:
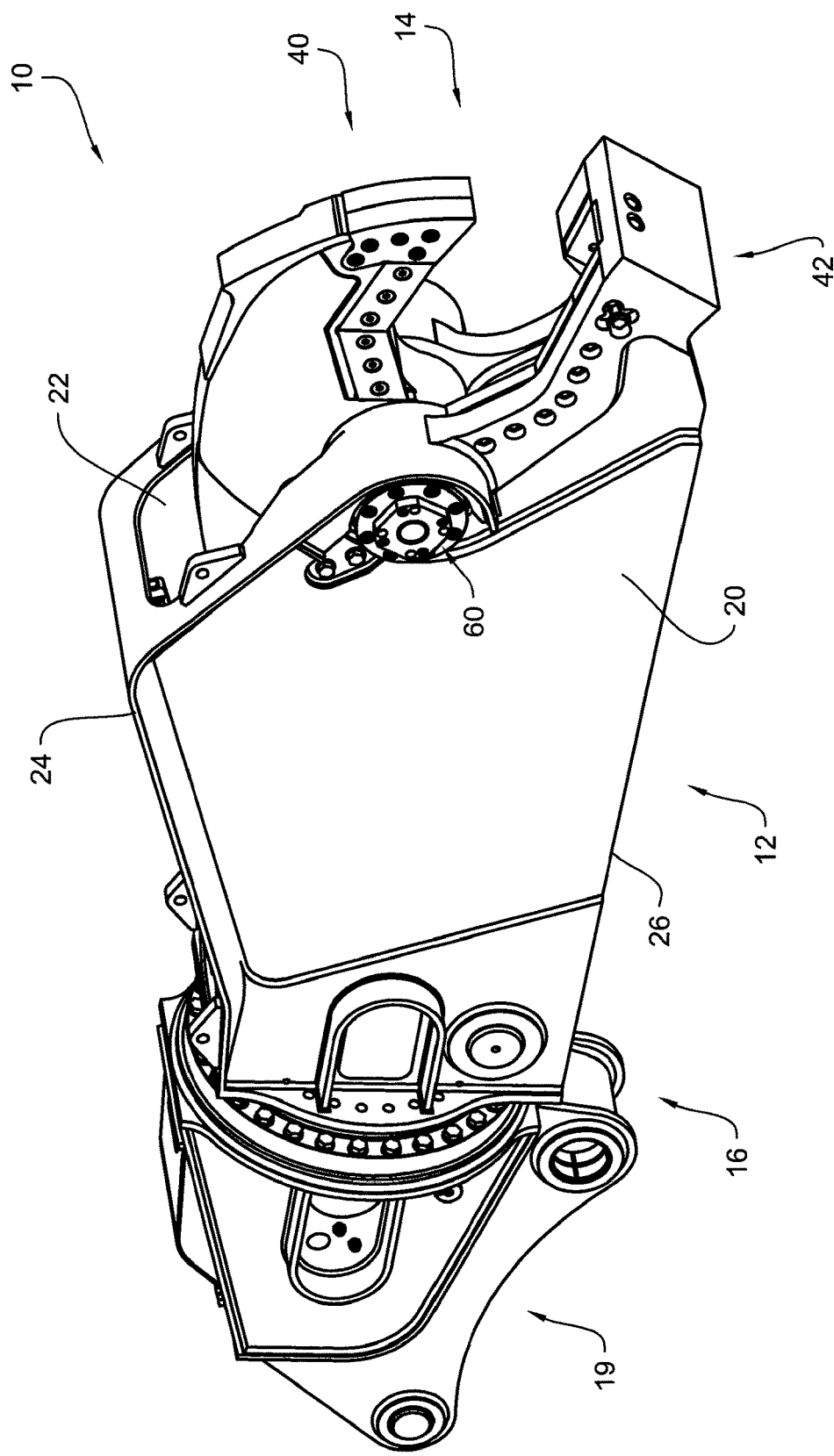
FIG. 1 is a right side perspective view (from the position of the operator) of one embodiment of a demolition shear attachment.
Figure 2:
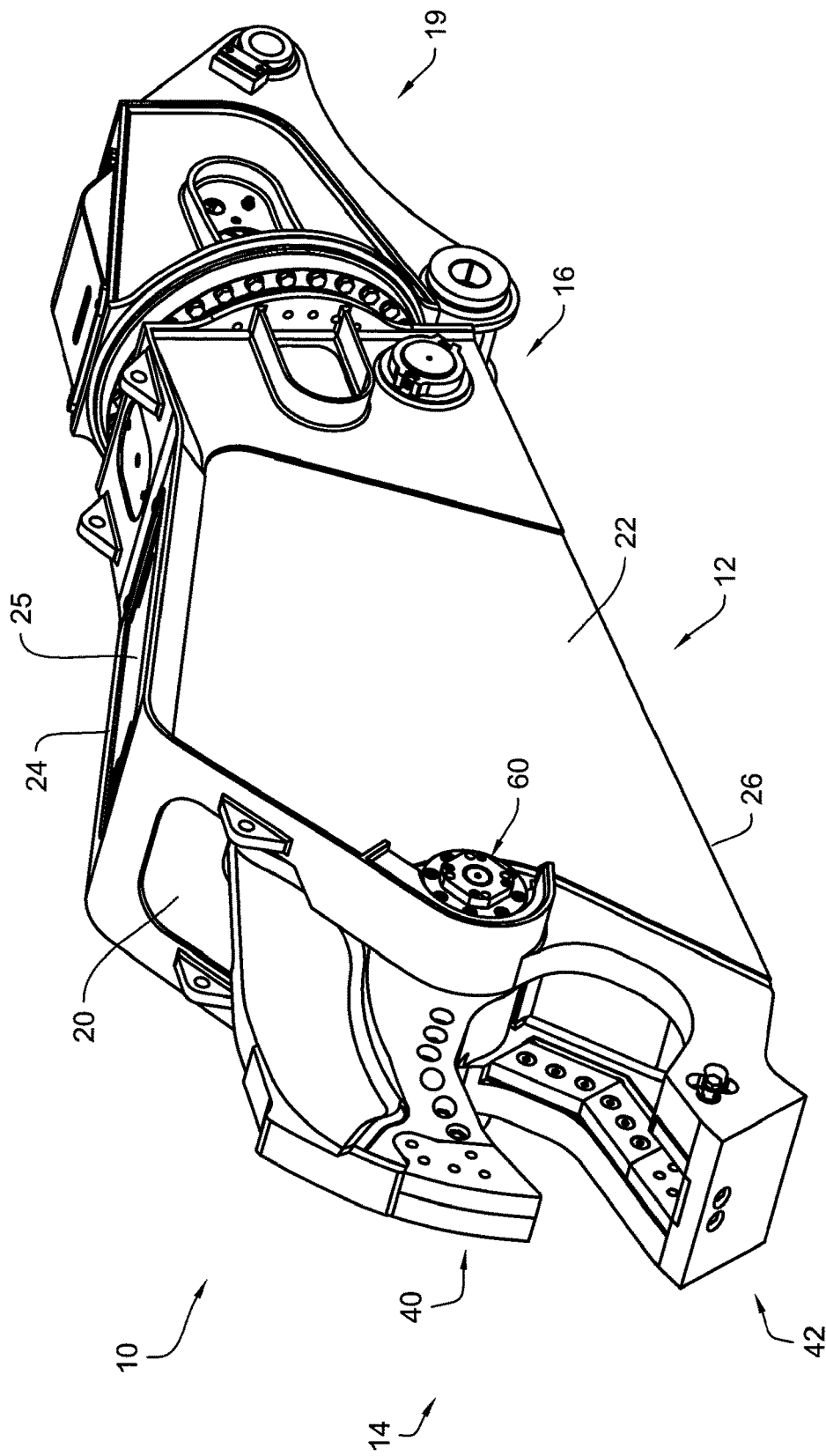
FIG. 2 is a left side perspective view of the demolition shear attachment of FIG. 1.
Figure 3:
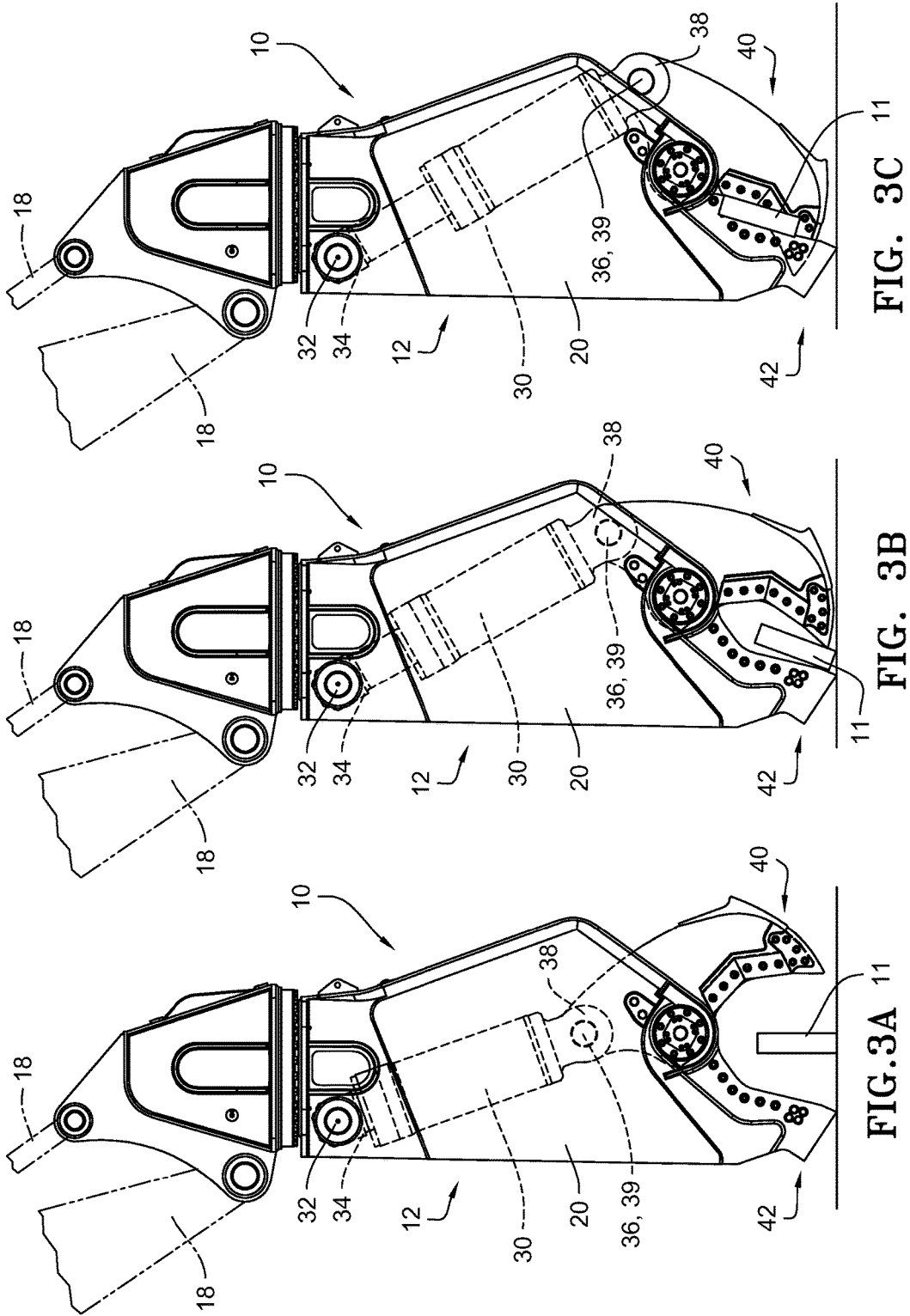
FIG. 3 illustrates the shear attachment of FIG. 1 in a typical operating position showing the movement of the upper jaw with respect to the lower jaw during a shearing operation.

Referring to the drawings wherein like reference numerals designate the same or corresponding parts throughout the several views, FIGS. 1 and 2 are perspective views from right and left sides, respectively (from the position of the operator), of one embodiment of a demolition shear attachment 10. The shear attachment 10 has a main body 12 with a forward end 14 and a rearward end 16. The rearward end 16 is adapted to be operably mounted to the boom or stick 18 (FIG. 3A) of an excavator such as by a swivel attachment 19 or other suitable mounting attachment as recognized and understood by those of skill in the art. At the forward end 14 of the main body 12 is a movable upper jaw 40 and a fixed lower 42 (discussed in detail later).

FIGS. 3A-3C show the shear attachment 10 mounted to the boom or stick of an excavator 18 of an excavator, and positioned in a typical operating position, and illustrating the movement of the upper jaw 40 closing with respect to the lower jaw 42 over an object 11 to be sheared. The object 11 to be sheared may be any structural member, such as a steel I-beam or channel, steel plate, pipe or some other material, such as scrap metal, sheet metal or any other object or material for which a demolition shear is suited for handling or processing.

Referring to FIGS. 1-4, the main body 12 is typically constructed of steel side plates 20, 22, a top plate 24 and a bottom plate 26 which together define a substantially enclosed area within which a hydraulic actuator 30 (FIGS. 3A-3C) and other hydraulic components of the shear attachment 10 are substantially enclosed and protected. The hydraulic actuator 30 is pivotally secured at a rearward end within the main body 12 by an actuator pivot pin 32 extending through the side plates 20, 22, internal gussets (not shown) and the cylinder rod clevis 34. The forward end of the hydraulic actuator 30 is pivotally attached to the movable upper jaw 40 by a cylinder pin 36 extending through the cylinder body clevis 38 and cylinder pin bore 39 (see also FIG. 17) in a rearward lobe of the upper jaw 40. Thus, it should also be appreciated, that as the hydraulic actuator 30 extends and retracts as illustrated in FIGS. 3A-3C, the upper jaw 40 rotates about the longitudinal axis of the jaw pivot shaft assembly 60 (discussed below) to open and close the upper jaw 40 with respect to the lower jaw 42. An access opening with an access cover 25 (FIG. 2) may be provided in the top plate to gain access to the interior of the body 12 for installation, maintenance, servicing and repair of the hydraulic actuator and other components of the hydraulic system.

Figure 4:
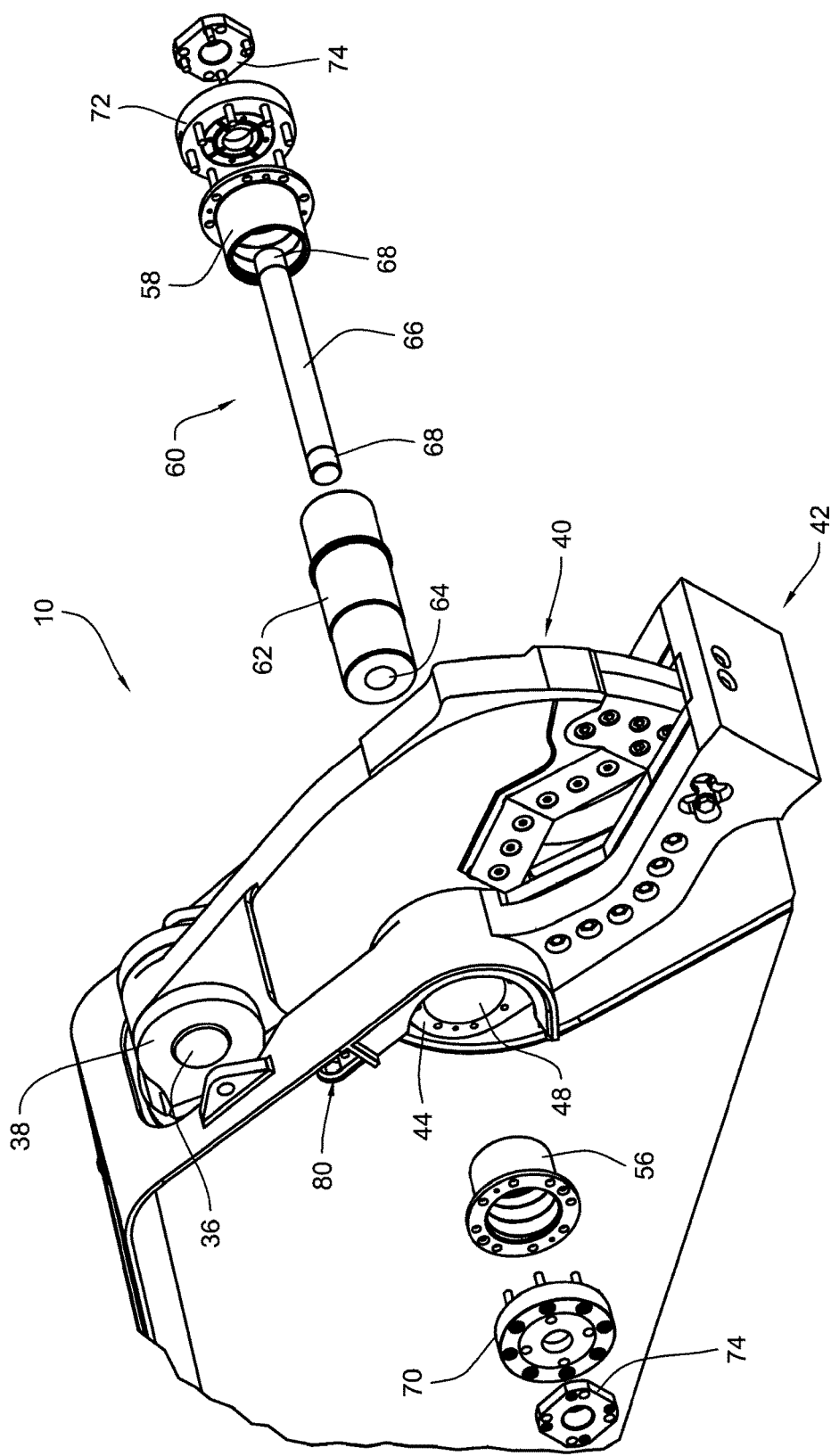
FIG. 4 is an exploded perspective view of the jaw pivot shaft of the shear attachment of FIG. 1
Figure 5:
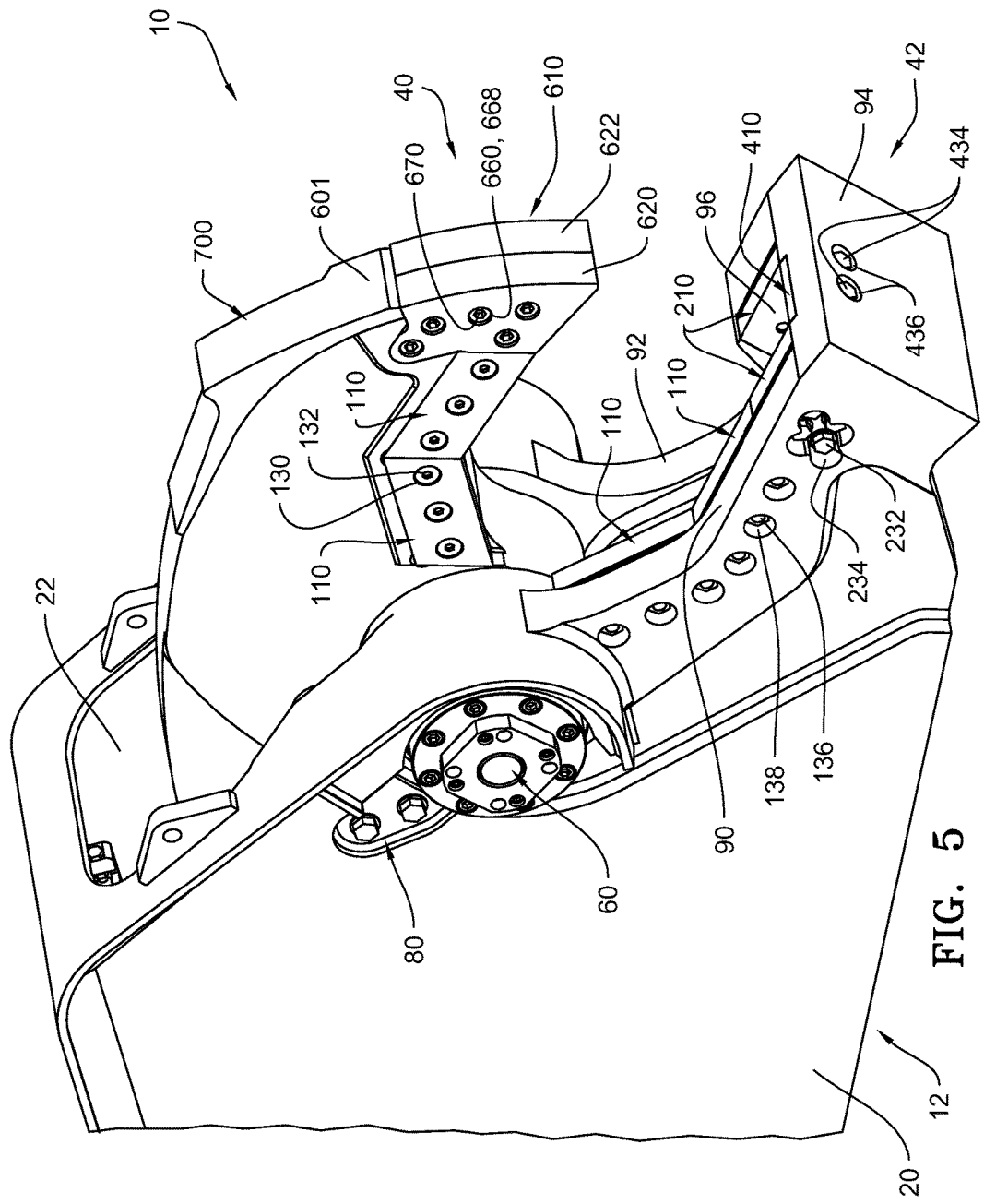
FIG. 5 is an enlarged view of FIG. 1 showing the jaws of the shear attachment.
Figure 8:
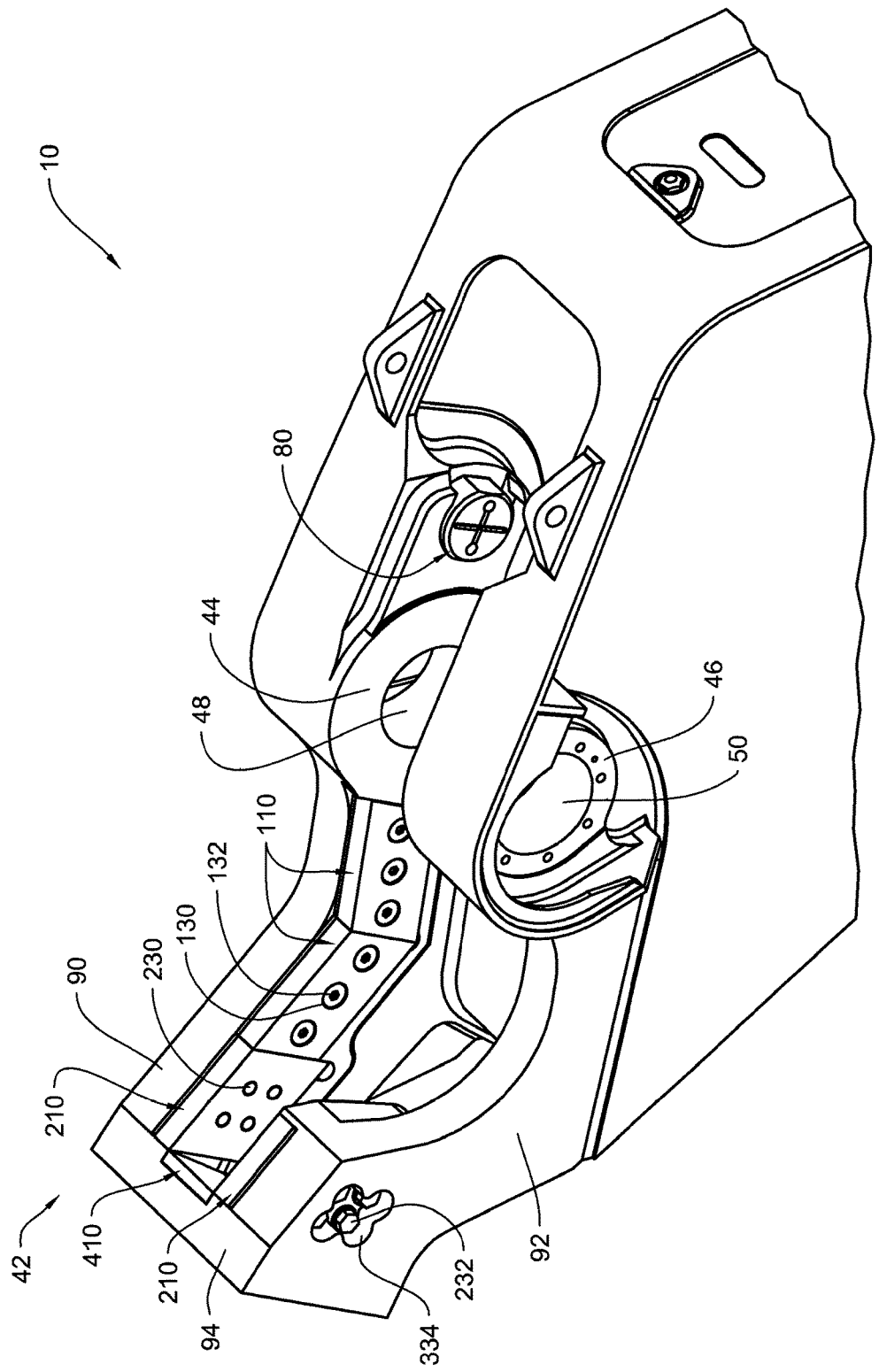
FIG. 8 is a perspective view of the lower jaw of FIG. 1 with the upper jaw removed to better show the blade-side shear blade inserts and guide blade insert.
Figure 9:
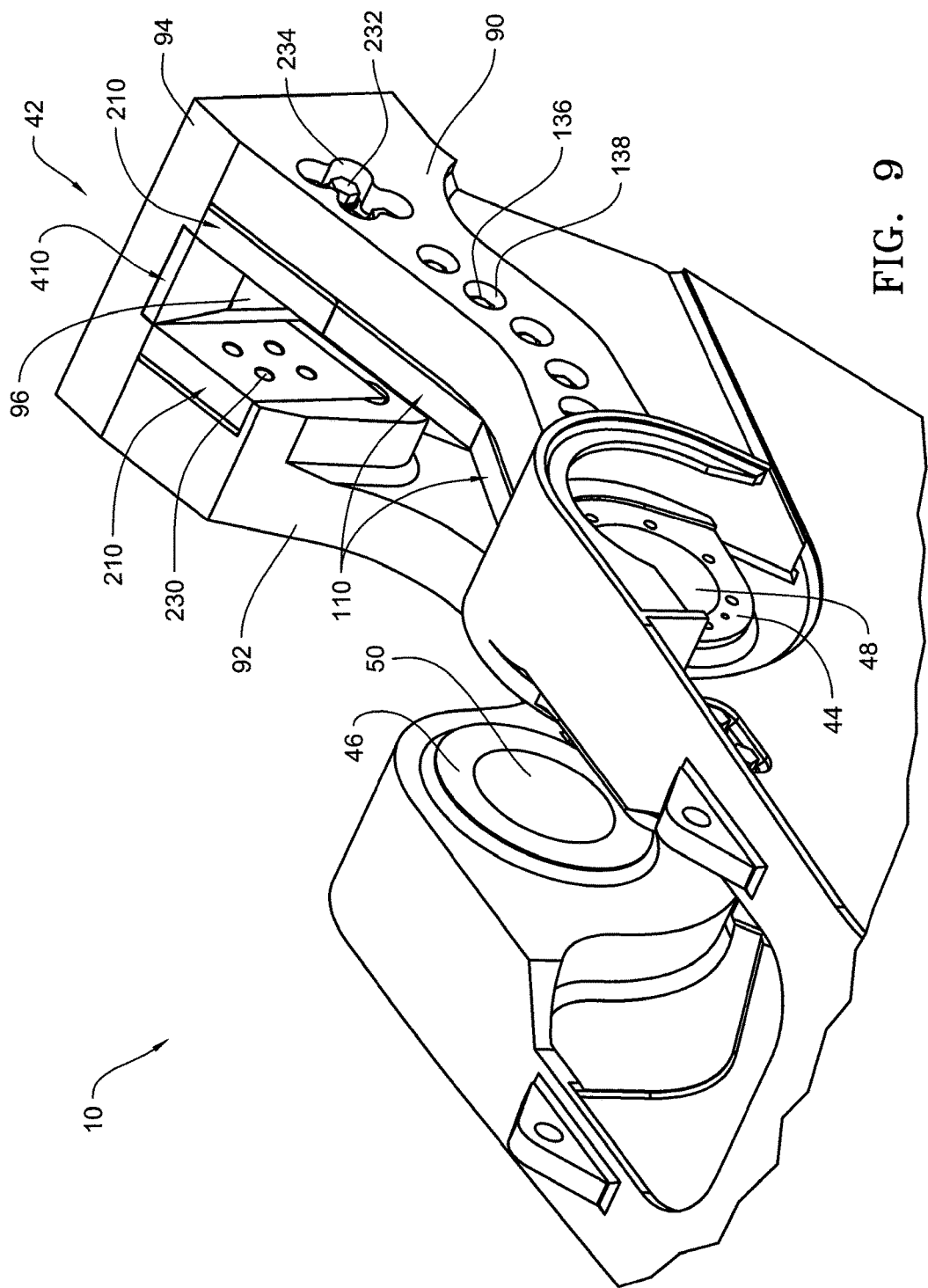
FIG. 9 is another perspective view of the lower jaw of FIG. 1 with the upper jaw removed to show guide-side guide blade insert and cross-blade insert.

As best illustrated in FIGS. 4, 8 and 9, jaw bosses 44, 46 on each side of the forward end 14 of the main body 12 include hub bores 48, 50. A jaw pivot shaft assembly 60 received within the hub bores 48, 50 and through a pivot shaft bore 54 (see FIG. 17) pivotally supports the upper jaw 40.

The jaw pivot shaft assembly 60 comprises flanged bushings 56, 58 fitted within the hub bores 48, 50. A main shaft 62 is press-fit into the pivot shaft bore 54 for rotation with the upper jaw 40. The main shaft 62 includes a central bore 64 which receives a tie rod 66 having threaded ends 68. End caps 70, 72 are secured to the flanged bushings 56, 58 by threaded connectors extending through aligned holes in the flange bushings 56, 58 and are threadably received by aligned internally threaded holes in the hubs 44, 46. Tie rod nuts 74 threadably receive the threaded ends 68 of the tie rods 66. The tie rod nuts 74 are secured to the end caps 70, 72 by threaded connectors threadably received into internally threaded aligned holes in the flange bushings 56, 58. It should be appreciated that the tie rod 66 and tie rod nuts 74 laterally restrain the hubs 48, 50 against lateral forces exerted on the jaws during the shearing operation.

As best viewed in FIGS. 4 and 8, lateral jaw stabilizing puck assemblies 80, such as disclosed in U.S. Pat. No. 7,216,575, may be provided along with corresponding wear plates or wear surfaces 82 (FIG. 17) on the adjacent side or sides of the upper jaw 40 to resist lateral movement of the upper jaw 40 during the shearing operation until the upper jaw enters the slot 96 of the lower jaw 42 (discussed below).

Referring to FIGS. 5-11, the lower jaw 42 includes forwardly extending, laterally spaced and substantially parallel jaw beams 90, 92 and a cross-beam 94 extending transversely between the forward ends of the laterally spaced jaw beams 90, 92. The laterally spaced jaw beams 90, 92 and the cross beam 94 together define a slot 96 into which the upper jaw 40 is received during the shearing process (see FIG. 3C and FIG. 4). As discussed in more detail below, the forwardly extending jaw beam 90 is adapted to receive shear blade inserts and is hereinafter referred to as the blade-side jaw beam 90. The other forwardly extending jaw beam 92 serves to provide structural rigidity to the lower jaw and also serves to laterally restrain and guide the upper jaw into the slot 96 during the shearing process and is hereinafter referred to as the guide-side jaw beam 92.

Figure 7:
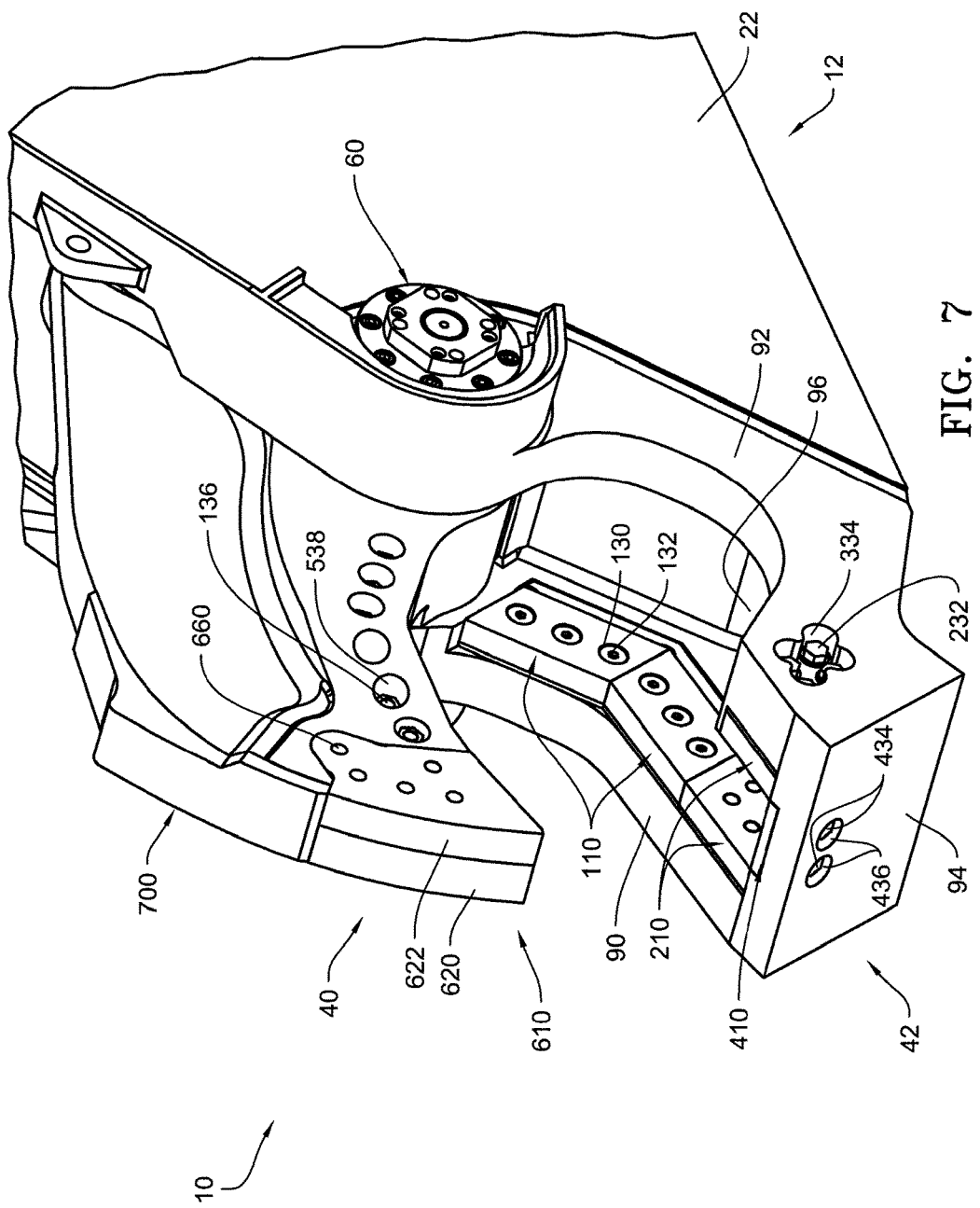
FIG. 7 is an enlarged view of FIG. 2 showing the jaws of the shear attachment.
Figure 10:
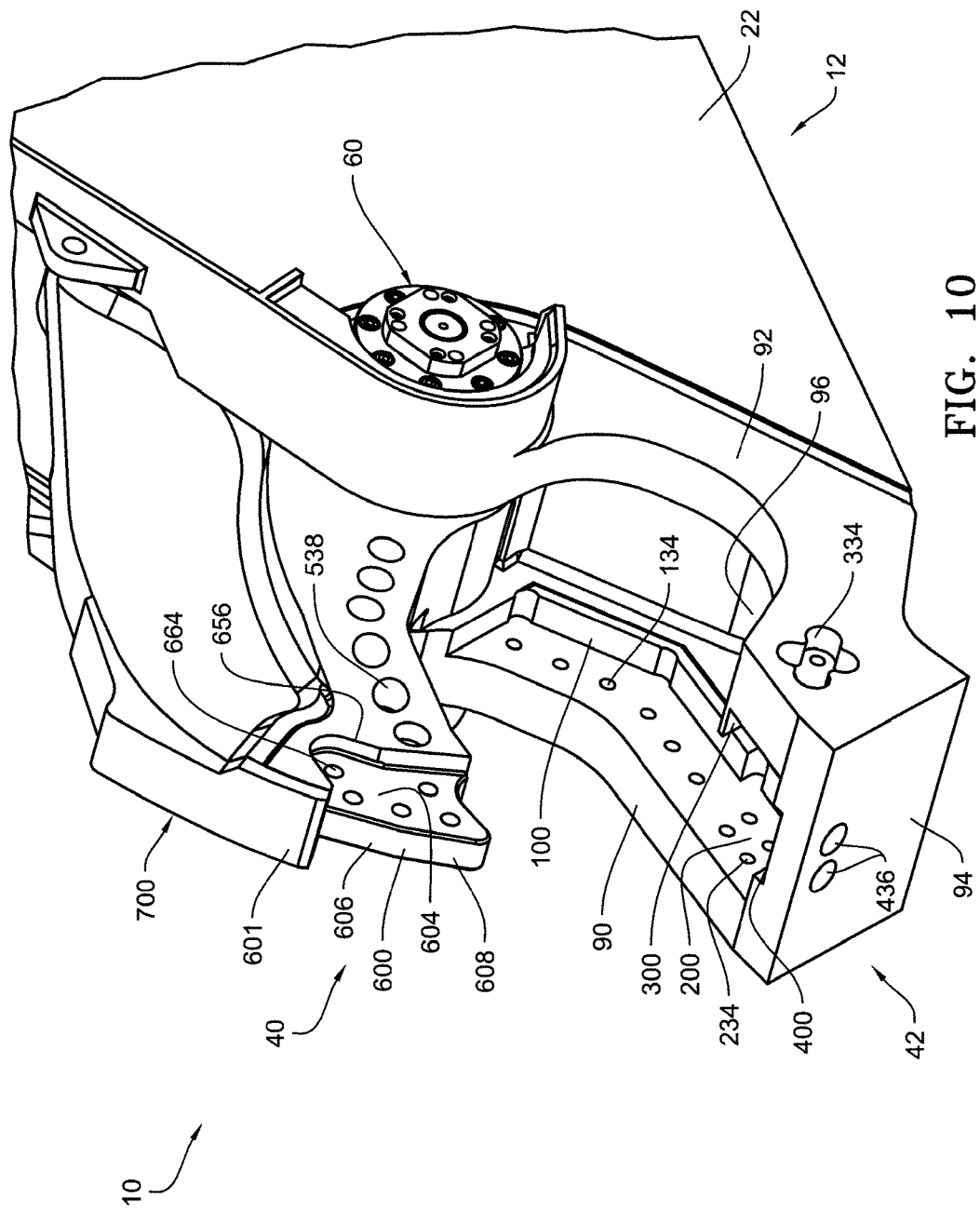
FIG. 10 is the same view as FIG. 7 with the blade inserts and piercing tip insert removed.
Figure 12:
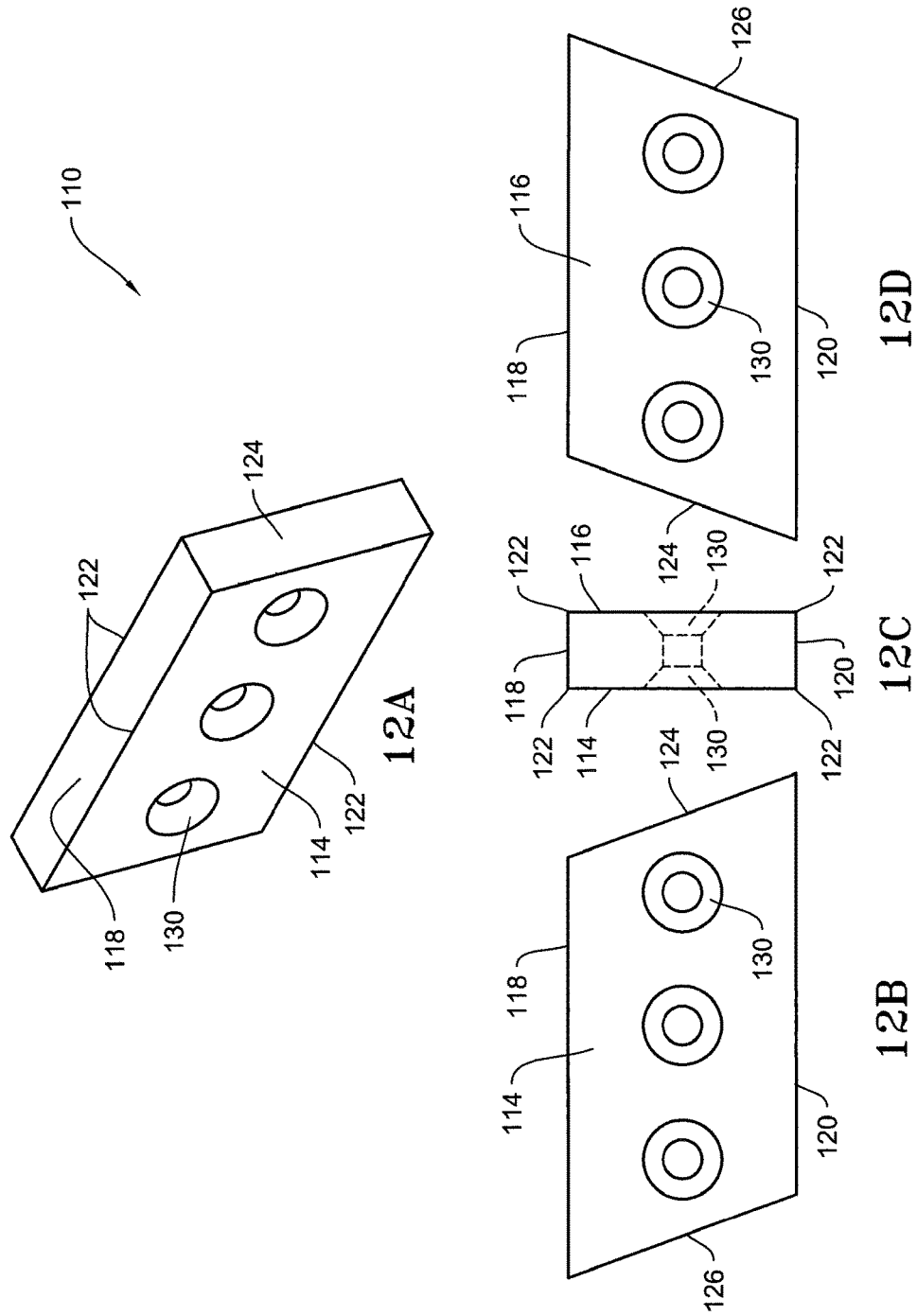
FIG. 12 shows different views of an embodiment of a shear blade insert, wherein 12A is a front perspective view, 12B is a front elevation view, 12C is an end elevation view and 12D is rear elevation view.

As best viewed in FIG. 10, the inner side of the blade-side jaw beam 90 includes a shear blade seat 100 which is adapted to receive a set of hardened steel shear blade inserts 110 (FIGS. 7 and 8). An embodiment of the shear blade inserts 110 is illustrated in FIG. 12. The shear blade inserts 110 each have generally planar vertical wear surfaces 114, 116 and generally planar horizontal wear surfaces 118, 120. The intersection of the vertical and horizontal wear surfaces define four shearing edges 122. The shear blade inserts 110 have parallel sloping end surfaces 124, 126 creating a parallelogram configuration so that when the shear blade inserts 110 are positioned and oriented in the shear blade seat 100 the adjacent end surfaces bear against each other in a downward apex (see FIGS. 7 and 8). It should be appreciated, that because the shear blade inserts 110 are in the shape of identical parallelepiped, they may be rotated and oriented with respect to one another within the shear blade seat 100 so that all four shearing edges 122 may be used as the shearing edges wear during use. The planar vertical wear surfaces 114, 116 include counterbore holes 130 for receiving threaded connectors 132 (preferably socket headed cap screws) to removably attach the shear blade inserts 110 within the shear blade seat 100. The counterbore holes 130 permit the heads of the threaded connectors 132 to be seated within the counterbore. The threaded ends of the threaded connectors 132 extend through the counterbore holes 130 and through aligned holes 134 (FIG. 10) in the shear blade seat 100 and are secured by nuts 136 (FIGS. 5 and 9), received within counterbore holes 138 on the outer side of the blade-side jaw beam 90.

As best viewed in FIG. 10, the inner side of the blade-side jaw beam 90 also includes a guide blade seat 200 which is adapted to receive a hardened steel guide blade insert 210 (best viewed in FIG. 8). An embodiment of the guide blade insert 210 is illustrated in FIG. 13. The guide blade insert 210 has generally planar vertical wear surfaces 214, 216 and generally planar horizontal wear surfaces 218, 220. The intersections of the vertical and horizontal wear surfaces define four shearing edges 222. The guide blade insert 210 has parallel sloping end surfaces 224, 226 creating a parallelogram configurations. The sloping end surfaces 224, 226 of the guide blade insert 210 are complimentary to the sloping end surfaces 124, 126 of the shear blade inserts 110 so that when the guide blade insert 210 is positioned and oriented in the guide blade seat 200 one of its end surfaces 224, 226 will bear against one of the end surfaces 124, 126 of the adjacently positioned shear blade insert 110 (as best illustrated in FIG. 8). It should be appreciated, that because the guide blade insert 210 is in the shape of a parallelepiped, it may be rotated and oriented within the guide blade seat 200 (and switched with the guide-side guide blade seat 300 discussed below) so that all four shearing edges 222 may be used as the shearing edges wear during use. The vertical wear surfaces 214, 216 include tapped internally threaded holes 230 for receiving threaded connectors 232 (e.g., bolts) to removably attach the guide blade insert 210 within the guide blade seat 200. The threaded ends of the threaded connectors 232 extend through aligned counterbore holes 234 (FIGS. 5 and 9) on the outer side of the blade-side beam 90 and are threadably received by the tapped internally threaded holes 230 in the guide blade insert 210.

Figure 11:
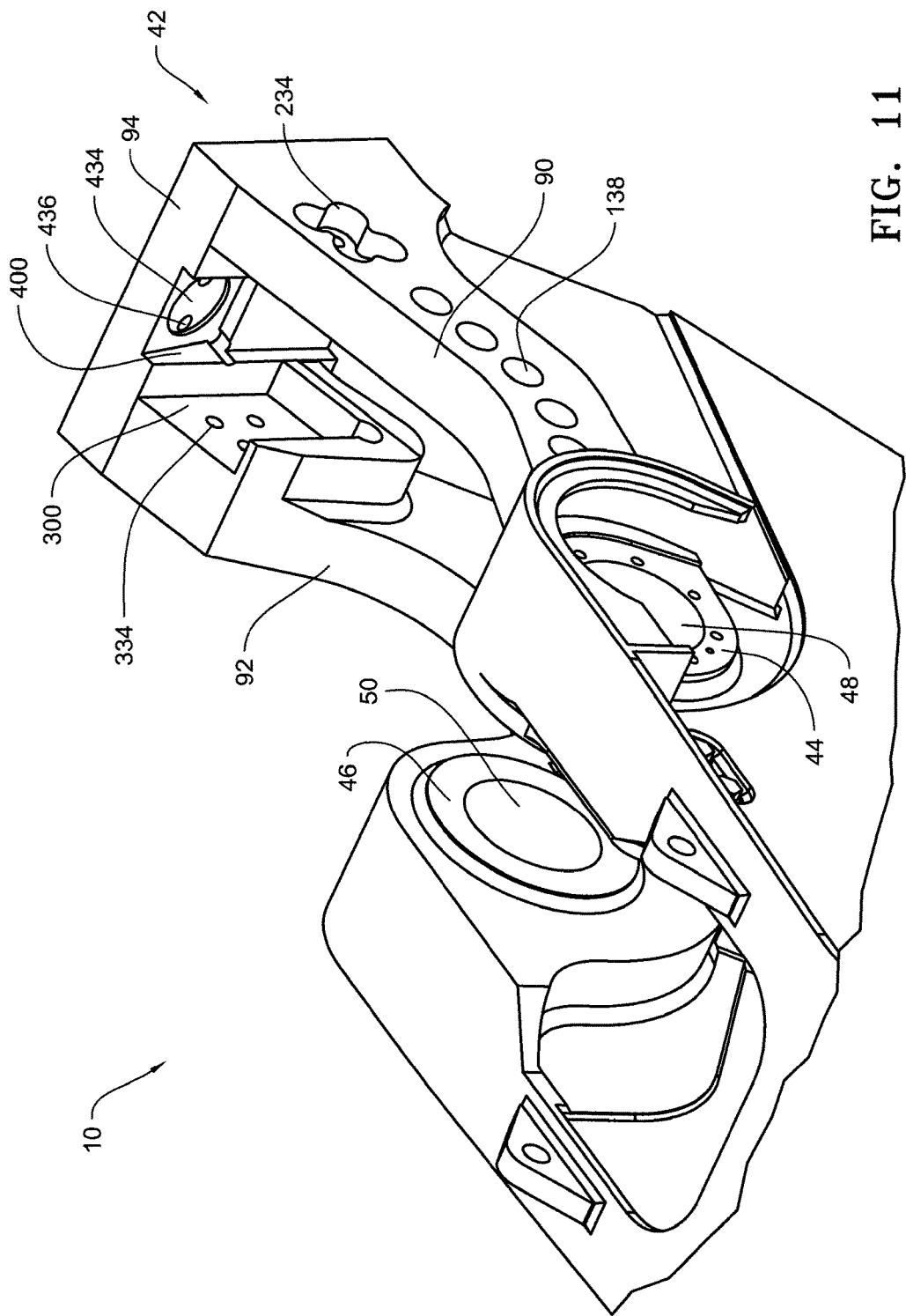
FIG. 11 is the same view of the lower jaw as FIG. 9 with the blade inserts removed.

As best viewed in FIGS. 9 and 11, the guide-side beam 92 also includes a guide-blade seat 300 (FIG. 11) which is adapted to receive the same guide blade insert 210 as received in the blade-side guide blade seat 200 so that the guide blade inserts 210 are interchangeable between the guide-side guide blade seat 300 and the blade-side guide blade seat 200. Accordingly, the guide blade insert 210 is retained and secured in the guide-side guide blade seat 300 in substantially the same manner as the blade-side guide blade seat 200 in that the same threaded connectors 232 (e.g., bolts) extend through aligned counterbore holes 334 (FIGS. 7, 8, 10) on the outer side of the guide-side jaw beam 92 and are threadably received by the tapped holes 230 in the guide blade insert 210.

As best viewed in FIGS. 9 and 11, the cross-beam 94 includes a cross-blade seat 400 (FIG. 11) which is adapted to receive a hardened steel cross-blade insert 410 (FIG. 9). An embodiment of the cross-blade insert 410 is illustrated in FIG. 14. The cross-blade insert 410 has a generally planar front wear surface 414, generally planar top and bottom wear surfaces 418, 420, generally planar end surfaces 424, 426 and a back side 428. The back side 428 includes four equally radially spaced internally threaded holes 430. The back side 428 is also keyed with a projection 432 which seats within a recess 434 (FIG. 11) in the cross-blade seat 400. The intersection of the front vertical wear surface 414 with the top and bottom wear surfaces 418, 420 and end surfaces define four cutting edges 422. The cross-blade insert 410 is preferably square with four radially spaced holes 430 so that it may be rotated 90 degrees four times within the cross-blade seat 400 so that all four cutting edges 422 may be used as the shearing edges wear during use. The cross-blade insert 410 is secured within the cross-blade seat 400 by threaded connectors 434 (such as bolts) extending through counterbore holes 436 (FIGS. 5 and 7) in the cross-beam 94. The ends of the threaded connectors 434 are received within the aligned internally threaded holes 430 in the back side surface 428 of cross-blade insert 410.

The upper jaw 40 has a blade-side and a guide-side which correspond to the adjacent blade-side jaw beam 90 and guide-side beam 92 of the lower jaw 42. The blade-side of the upper jaw 40 includes a shear blade seat 500 (FIG. 6) which is adapted to receive the same shear blade inserts 110 (FIG. 5) as used in the shear blade seat 100 of the lower jaw 42 so that the shear blade inserts 110 are interchangeable between the upper and lower jaws, thereby reducing the number of different blade configurations needed for the shear attachment 10. However, in the upper jaw, the shear blade inserts 110 are oriented in an upward apex as opposed to the downward apex in the lower jaw (compare FIGS. 5 and 7). The shear blade inserts 110 are secured in the upper jaw in substantially the same manner as the lower jaw. The threaded ends of the threaded connectors 132 extend through the counterbore holes 130 and through aligned holes 534 in the upper shear blade seat 500 and are secured by nuts 136 received within counterbores 538 (FIG. 7) on the guide-side of the upper jaw 40.

Figure 6:
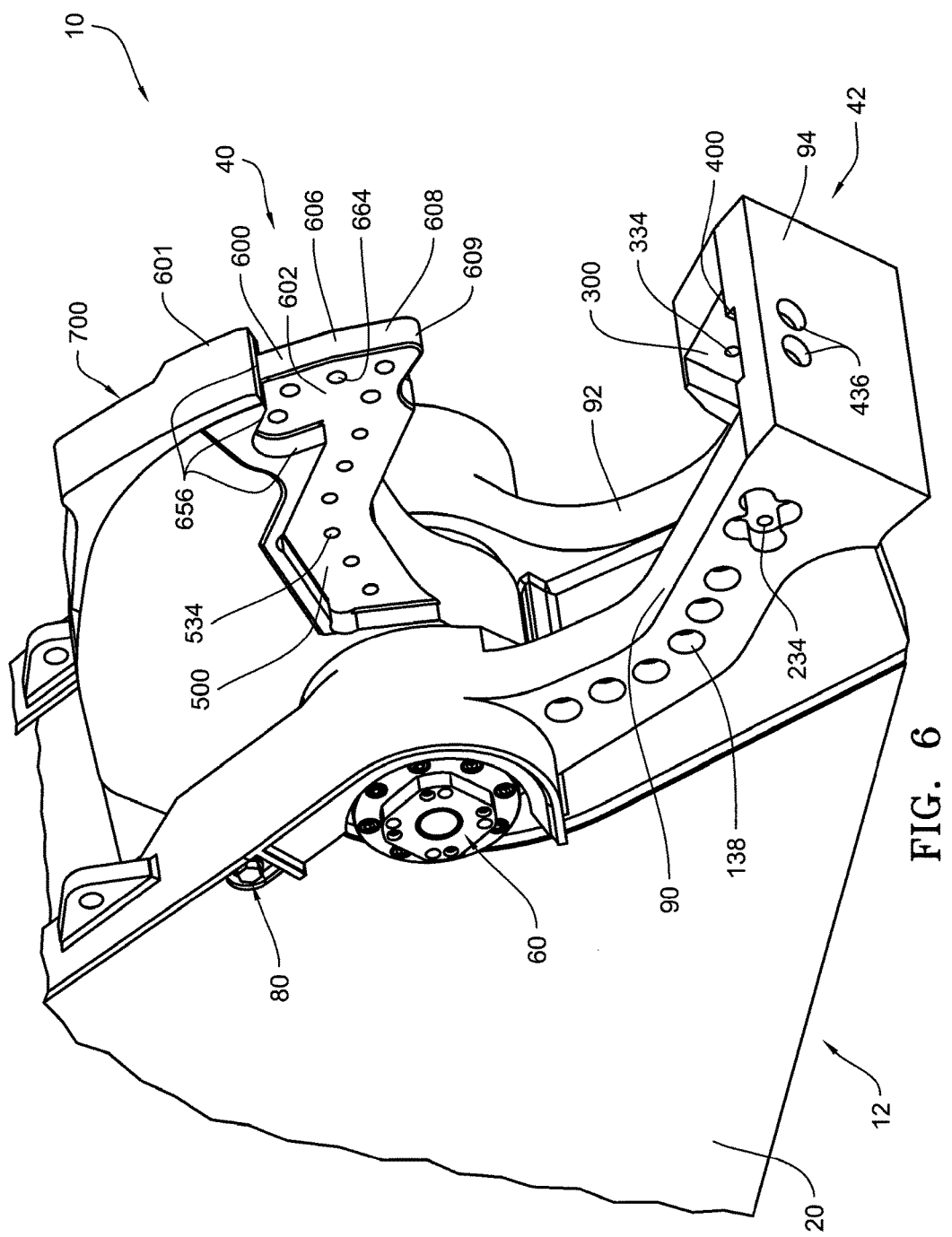
FIG. 6 is the same view as FIG. 5 but with the blade inserts and piercing tip inserts removed.
Figure 17:
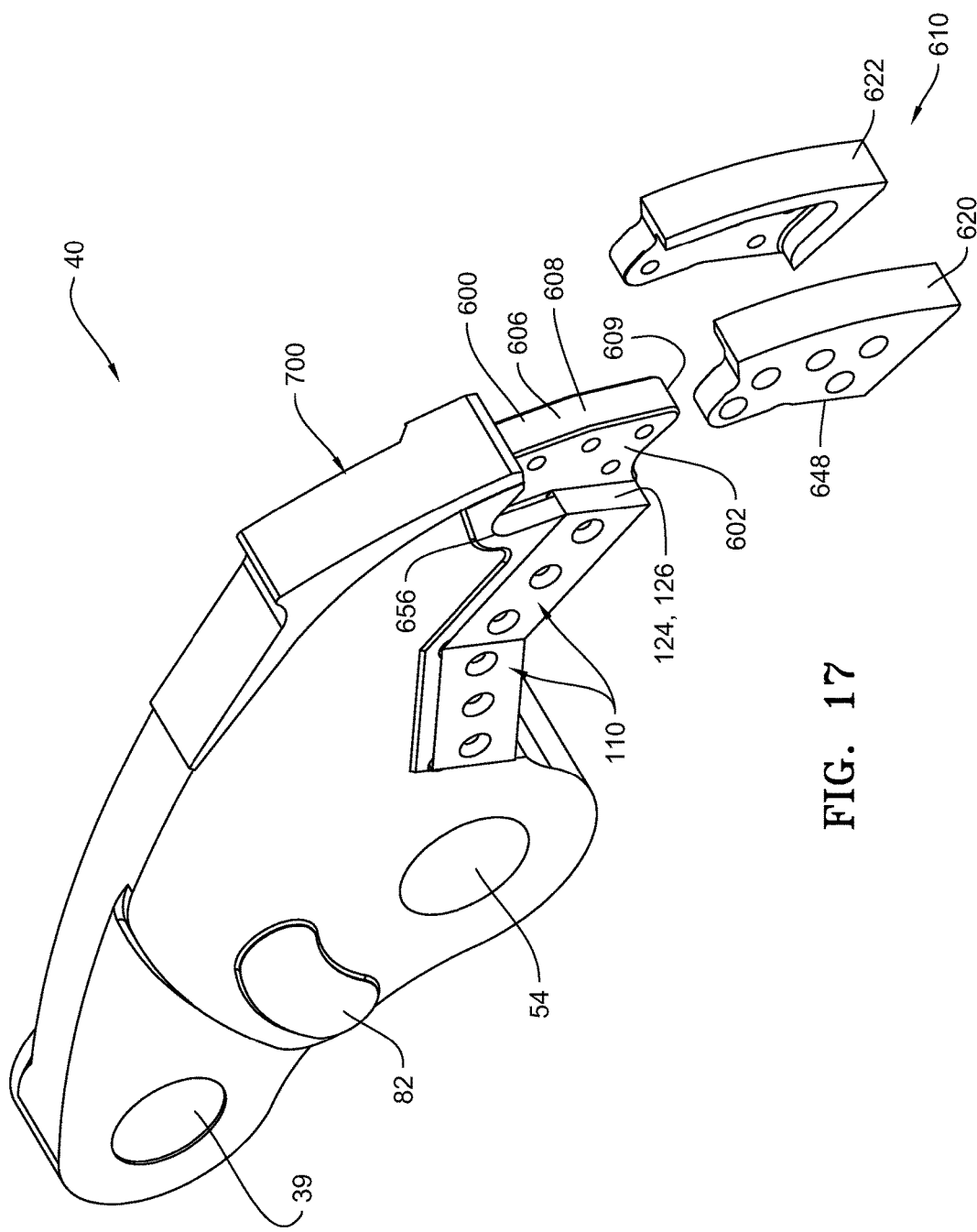
FIG. 17 is a perspective view of the upper jaw of the shear attachment of FIG. 1 in isolation with the piercing tip inserts shown exploded with respect to the nose seat.

Referring to FIGS. 6, 10 and 17, the forward most end of the upper jaw 40 or nose 601 includes a nose seat 600 adapted to receive a hardened steel piercing tip insert 610 (FIGS. 5, 7, 17) to protect the parent material of the upper jaw nose from wear during use. The nose seat 600 includes a blade-side nose seat 602 (FIGS. 6 and 17), a guide-side nose seat 604 (FIG. 10), and a front nose seat 606 (FIGS. 6, 10, 17) which results in a narrowed nose portion 608. The forward most nose tip 609 of the nose seat 600 is preferably radiused to minimize stress concentrations on the nose portion 608, both during the manufacturing process and during use. The piercing tip insert 610 is comprised of two halves 620, 622 which are substantially mirror images of each other except for the connector holes in each half (discussed later). The half which extends over the blade-side of the nose is hereinafter referred to as the blade-side half 620, and the half which extends over the guide-side of the nose is hereinafter referred to as the guide-side half 622.

FIG. 15 shows various views of an embodiment of the blade-side half 620. FIG. 16 shows similar views of an embodiment of the guide-side half 622. Each of the piercing tip halves 620, 622 includes an outer sidewall 630 having a substantially planar vertical wear surface 632 and a substantially planar vertical inner bearing surface 634. Each half 620, 622 also includes a laterally inward projecting front wall 636 having an outer curved wear surface 638 and an inner bearing surface 640. Each piercing tip half 620, 622 also includes a laterally inward projecting bottom leg 642 having a bottom planar wear surface 644 and an upper leg bearing surface 646. Each of the piercing tip halves 620, 622 further includes an end bearing surface 648 and an ear 650 having upper ear bearing surface 651 and a lower ear bearing surface 653. The ear 650 may have a radiused periphery to reduce stress concentrations. The lower ear bearing surface 653 extends rearwardly of the end bearing surface 648, the purpose of which is discussed later in connection with FIGS. 22 and 23. The intersection of the planar vertical wear surface 632 and the bottom planar wear surface 644 defines a shearing edge 652. The intersection of the curved wear surface 638 of the front wall 636 and the bottom planar wear surface 644 defines a front piercing edge 654 (the front piercing edge may be chamfered).

As best viewed in FIGS. 6, 10 and 17, the nose seats 602, 604, 606 define peripheral bearing edge surfaces 656 which complimentarily receive the outer peripheries of the piercing tip halves 620, 622. It should be appreciated that the inner surface 640 of the laterally inward projecting front wall 636 and the upper surface 646 of the laterally inward projecting bottom leg 642 of each piercing tip half 620, 622 is approximately half the width of the narrowed nose portion 608 so that when the piercing tip halves 620, 622 are mounted in the nose seat 600, the inner bearing surfaces 640 of the sidewalls 630 and the upper leg bearing surfaces 646 of the bottom legs 642 of the piercing tip halves 620, 622 bear against the respective bearing surfaces of the blade-side nose seat 602, the guide-side nose seat 604 and the front nose seat 606. Additionally, the upper ear bearing surface 651 and the lower ear bearing surface 653 of the tip halves 620, 622 bear against peripheral bearing edge surfaces 656 of the nose seat 600. On the blade-side of the nose 601, one of the sloping ends 124, 126 (depending on orientation) of the upper shear blade insert 110 abuts and bears against the back end bearing surface 648 of the blade-side half 620. As such, the blade-side piercing tip half 620 is rotationally restrained from outward rotation (as discussed later) by both the blade insert 110 and the peripheral bearing edge surfaces 656 which mateably receive of the upper ear bearing surface 651 and the lower ear bearing surface 653 of the blade-side nose seat. The guide-side piercing tip half 622 is rotationally restrained from movement by the peripheral bearing edge surfaces 656 which mateably receive of the upper ear bearing surface 651 and the lower ear bearing surface 653 of the guide-side nose seat 604.

It should be appreciated that when the two piercing tip halves 620, 622 are mounted in the nose seat 600, the narrowed nose portion 608 is completely surrounded by the hardened steel piercing tip insert 610 thereby protecting the parent material of the nose 601 from wear during use.

In addition to being rotationally restrained by the peripheral bearing edge surfaces 656, the two piercing tip halves 620, 622 are secured to the narrowed nose tip 608 with threaded connectors 670. In a preferred embodiment, the threaded connectors are socket headed cap screws. The two halves 620, 622 include aligned holes 660 through their respective outer sidewalls 632. Corresponding aligned holes 664 are provided through the narrowed nose tip 608. Concentric counterbores 668 are provided over the holes 660 in the outer wall 632 of the blade-side half 620. The aligned holes 660 in the outer wall 632 of the guide-side half 622 are tapped with internal threads. The counterbores 668 permit the heads of the threaded connectors 670 to be seated within the counterbores 668. The threaded ends of the threaded connectors 670 extend through the holes 660 in blade-side half 620 and through the aligned holes 664 in the narrow nose tip 608 and are threadably received by the internally threaded aligned holes 660 of the guide-side tip half 622. Obviously, the counterbores 668 and the internal threaded holes 660 in the two tip halves 620, 622 could be reversed if desired. Alternatively, counterbores 668 could be provided in outer walls 632 of both tip halves 620, 622 for receiving the heads of the threaded connectors 670 and to receive a nut (not shown) on the opposing tip half rather than tapping the holes 660 of one of the halves. As discussed in more detail later in connection with FIGS. 18 and 22, the holes 660, 664 are aligned along an arc concentric with the front edge of the piercing tip 610 (i.e., the outer curved wear surface 638) to ensure a more uniform loading across the threaded connectors 670.

It should be appreciated that when mounted to the upper jaw 40, the planar vertical wear surfaces 114, 116 (depending on orientation) of the shear blade inserts 110 are substantially coplanar with the vertical wear surface 632 of the blade-side tip half 620 and the shearing edges 122, 652 of the shear blade inserts 110 and piercing tip insert 610 are substantially aligned. Similarly, on the lower jaw 42, the planar vertical wear surfaces 114, 116 (depending on orientation) of the shear blade inserts 110 are substantially coplanar with the vertical wear surface 214 of the blade-side guide blade insert 210 and their respective shearing edges 122, 222 are substantially aligned. It should also be appreciated that the substantially coplanar vertical wear surfaces 114, 116, 632 and shearing edges 122, 652 of the upper shear blade inserts and piercing tip insert 610 are slightly laterally, inwardly offset from the shearing edges 122, 232 of the shear blade inserts 110 and blade-side guide blade insert 210 of the lower jaw (preferably between a range of about 0.01 inches and 0.05 inches), to permit the upper shearing edges to pass by the shearing edges of the lower jaw as the upper jaw moves through its range of motion and into the slot 96 of the lower jaw 42. Likewise, the shearing edge 652 of the guide-side piercing tip half 622 is laterally inwardly offset from the shearing edge 222 of the guide-side guide blade insert 210 preferably between a range of about 0.01 inches and 0.05 inches. Accordingly, the width of the piercing tip insert 610 is less than the width between the opposing shearing edges 222 of the blade-side and guide-side guide blades 210 (preferably between a range of about 0.02 and 0.1 inches), such that the piercing tip insert 610 can pass between the lower dual guide blades 210 as the upper jaw closes into the slot 96 of the lower jaw 42. Shims may be inserted between the various inserts 110, 210, 610 and their respective seats 100, 200, 300, 500, 600 to maintain the close tolerances between the respective shearing edges.

Figure 18:
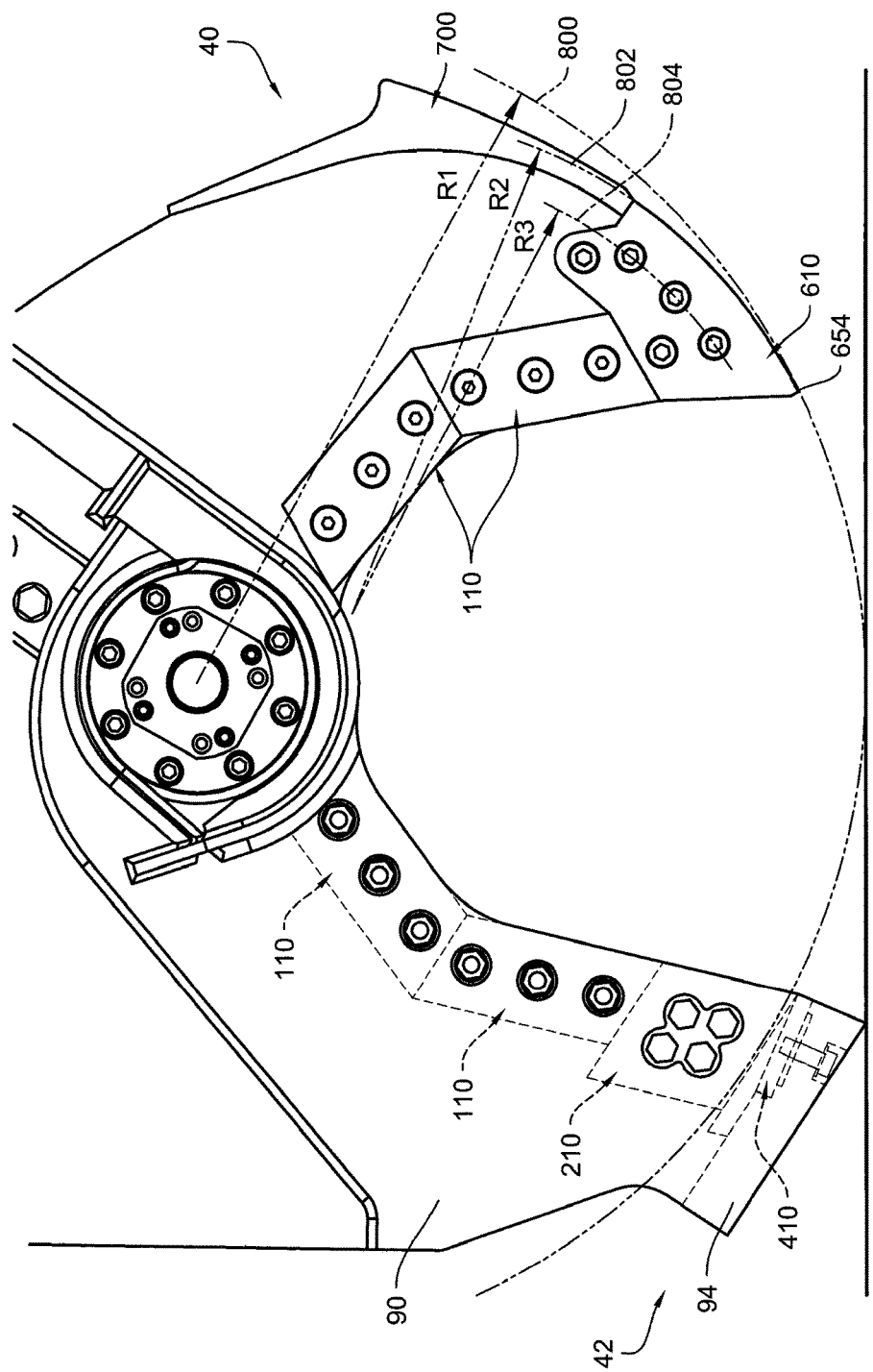
FIG. 18 is an enlarged side elevation view of the upper and lower jaws of the shear attachment of FIG. 1 with the upper jaw in the fully open position.
Figure 19:
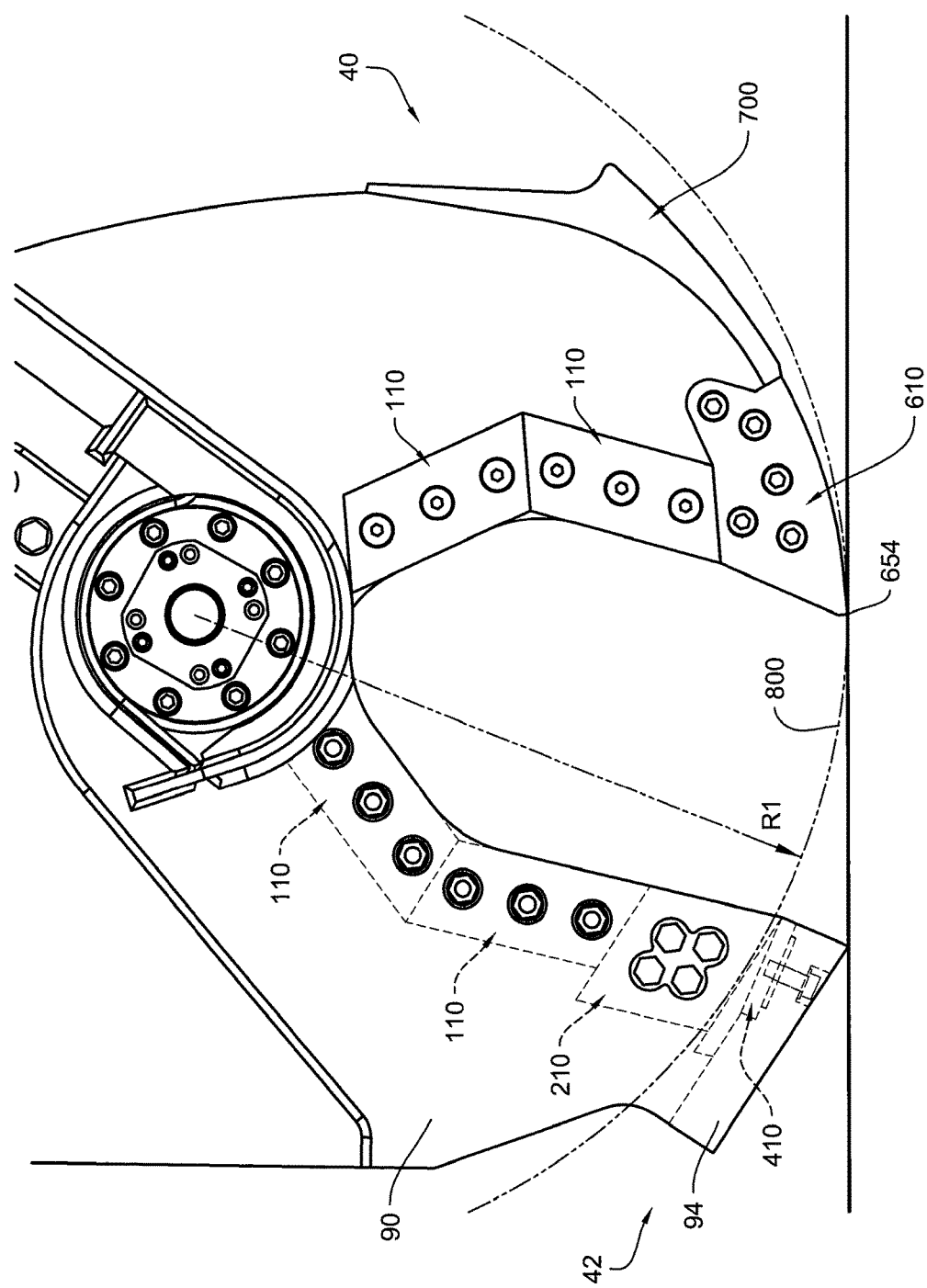
FIG. 19 is an enlarged side elevation view of the upper and lower jaws of the shear attachment of FIG. 1 with the upper jaw in a partially closed position.
Figure 20:
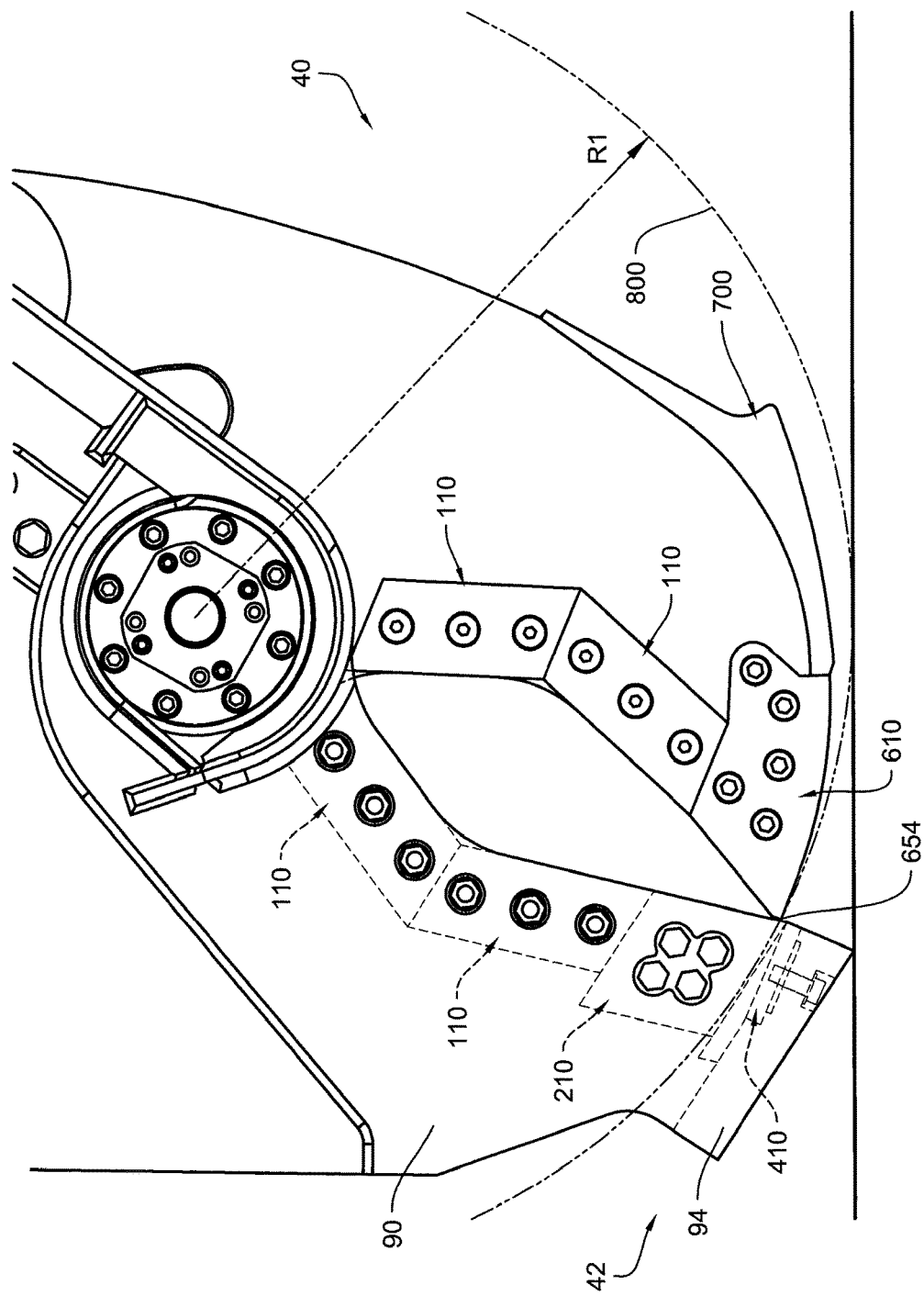
FIG. 20 is an enlarged side elevation view of the upper and lower jaws of the shear attachment of FIG. 1 with the upper jaw about to enter the slot in the lower jaw.

FIGS. 18-22 are enlarged side elevation views of the jaws 40, 42 to better illustrate the relationship of the blade inserts 110, 210 and piercing tip insert 610 cross-blade insert 410 during movement of the upper jaw—i.e., from the fully open position (FIG. 18), to the fully closed position (FIG. 21) in which the upper jaw reaches full depth into the slot 96 of the lower jaw 42. FIG. 19, shows the upper jaw partially closed wherein the front piercing edge 654 of the piercing tip insert 610 is perpendicular or normal to the ground surface. FIG. 20, shows the upper jaw in a position where the front piercing edge 654 intersects the lower jaw 42.

A nose wear shoe 700 is secured (such as by welding) to the nose 601 of the upper jaw 40 above the piercing tip insert 610 to protect the parent material of the upper jaw from wear during use. As the nose wear shoe 700 wears down, it may be removed and replaced with another wear shoe 700. The wear shoe 700 may be fabricated from the same material as the parent material or it may be fabricated from hardened steel. Referring to FIG. 20, the nose wear shoe preferably extends along the nose a sufficient distance to ensure that the parent material of the nose is protected to at least the full depth of entry of the upper jaw 40 into the lower jaw 42. In an alternative embodiment, the piercing tip insert 610 may be extended along the nose 601 to the full dept of entry of the upper jaw into the lower jaw. In such an embodiment, the nose seat 600 would likewise be extended and additional holes 660 may be necessary to adequately restrain the longer piercing tip insert 610 to the narrowed nose 608.

It should be appreciated that the parent material of the nose 601 above the piercing tip insert 610 is more susceptible to wear than the hardened steel piercing tip insert 610. Accordingly, without a wear shoe 700, the nose 601 could wear down to the point that the upper edge of the piercing tip insert 610 projects above the nose. If the upper edge of the piercing tip insert 610 projects outwardly from the nose 601, the projection could potentially snag on material caught in the jaws as the upper jaw re-opens or is retracted from the lower jaw. If sufficient retract force is exerted on the upper jaw, the piercing tip insert could be pulled away from the nose by the snagged material, shearing the threaded connectors in the process or breaking the piercing tip insert. Accordingly, as hereinafter described, the nose 601 of the upper jaw is configured to minimize the risk of snagging, even when a wear shoe 700 is not mounted to the nose 601 or where the wear shoe itself is worn down such that the parent material of the nose is no longer protected by the wear shoe.

Figure 21:
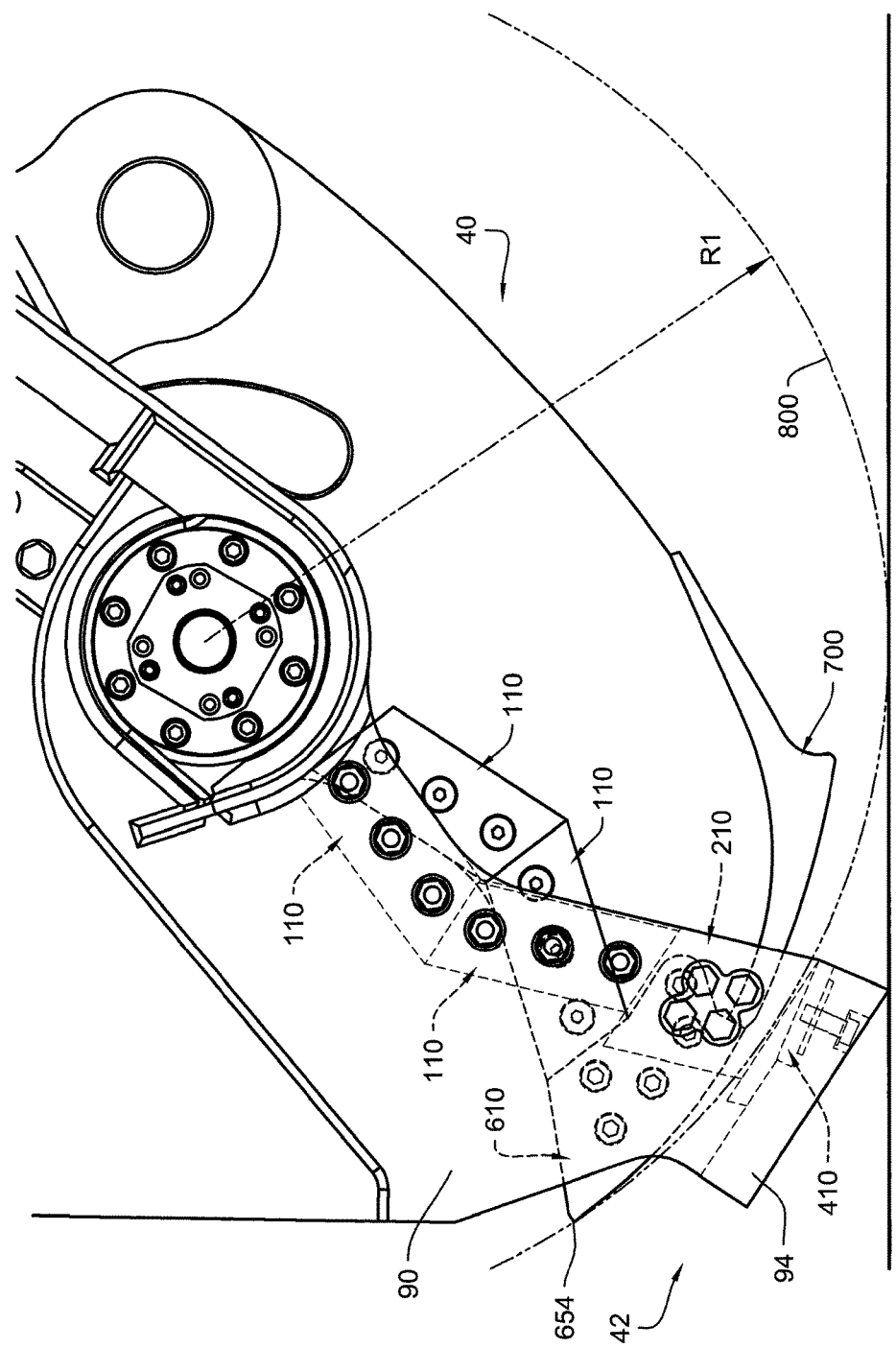
FIG. 21 is an enlarged side elevation view of the upper and lower jaws of the shear attachment of FIG. 1 with the upper jaw fully closed and extending into the slot of the lower jaw.

FIGS. 18 and 21 illustrate a preferred configuration of the nose 601 to avoid or minimize occurrences of snagging. The phantom line designated by reference numeral 800 identifies the arc created by the forward most front piercing tip edge 654 of the piercing tip insert 610 as the upper jaw moves through its range of motion. The arc 800 has a radius R1 to the center axis of the jaw pivot shaft 60. The outermost periphery of the nose 601 from the forward piercing edge 654 of the piercing tip 610 to the end of the nose wear shoe 700 or to the point on the nose which corresponds to the maximum depth that the nose 601 penetrates the lower jaw is configured to transitions away from the front piercing tip edge arc 800 in a substantially smooth nose arc 802. The nose arc 802 has a radius R2 which is less than the radius R1, such that radial distances from the central axis of the jaw pivot shaft 60 to points along the nose 601 or nose arc 802 continually decrease relative to the front piercing tip edge arc 800. Stated another way, the distance between the piercing tip front edge arc 800 and the nose arc 802 continually increases along the nose 601 or nose arc 802 from the piercing tip front edge 654. This configuration allows the nose 601 to only make contact at the piercing tip front edge 654, thereby avoiding or reducing the likelihood of the nose 601 scraping along objects being pierced by the piercing tip 610, thereby minimizing wear along the nose. Additionally, because the nose increasingly transitions away from the piercing tip edge arc 800, it reduces the likelihood of snagging of material caught in the jaws even if the parent material of the nose becomes worn down to where the upper edge of the piercing tip insert 610 projects outwardly from the worn parent material of the nose.

Furthermore, the piercing tip seat 600 and piercing tip insert 610 are configured to ensure retention of the piercing tip if a projecting edge of the piercing tip becomes snagged or if the upper jaw becomes jammed by material trapped in the jaws. For example, in FIG. 22 the hatched area 900 is intended to represent trapped or lodged material caught between the wear surfaces of the piercing tip insert 610 and the guide shear blade inserts 210 causing the upper jaw to become jammed within the slot 96 of the lower jaw 42 such that the upper jaw 40 cannot retract or re-open. The retract force F of the upper jaw 40 (exerted by the hydraulic actuator 30 pulling on the upper jaw) attempts to pull the piercing tip insert 610 in the direction perpendicular to the radial line 806 extending from the center axis of the jaw pivot shaft 60 to the midpoint of the trapped material 900. It should therefore be appreciated that any bearing surface which is less than 90 degrees to the radial line 806, will resist the retract force F. Accordingly, the rearwardly projecting ears 650 of the piercing tip insert 610 ensure that a bearing surface is provided to resist the retract force F.

Figure 22:
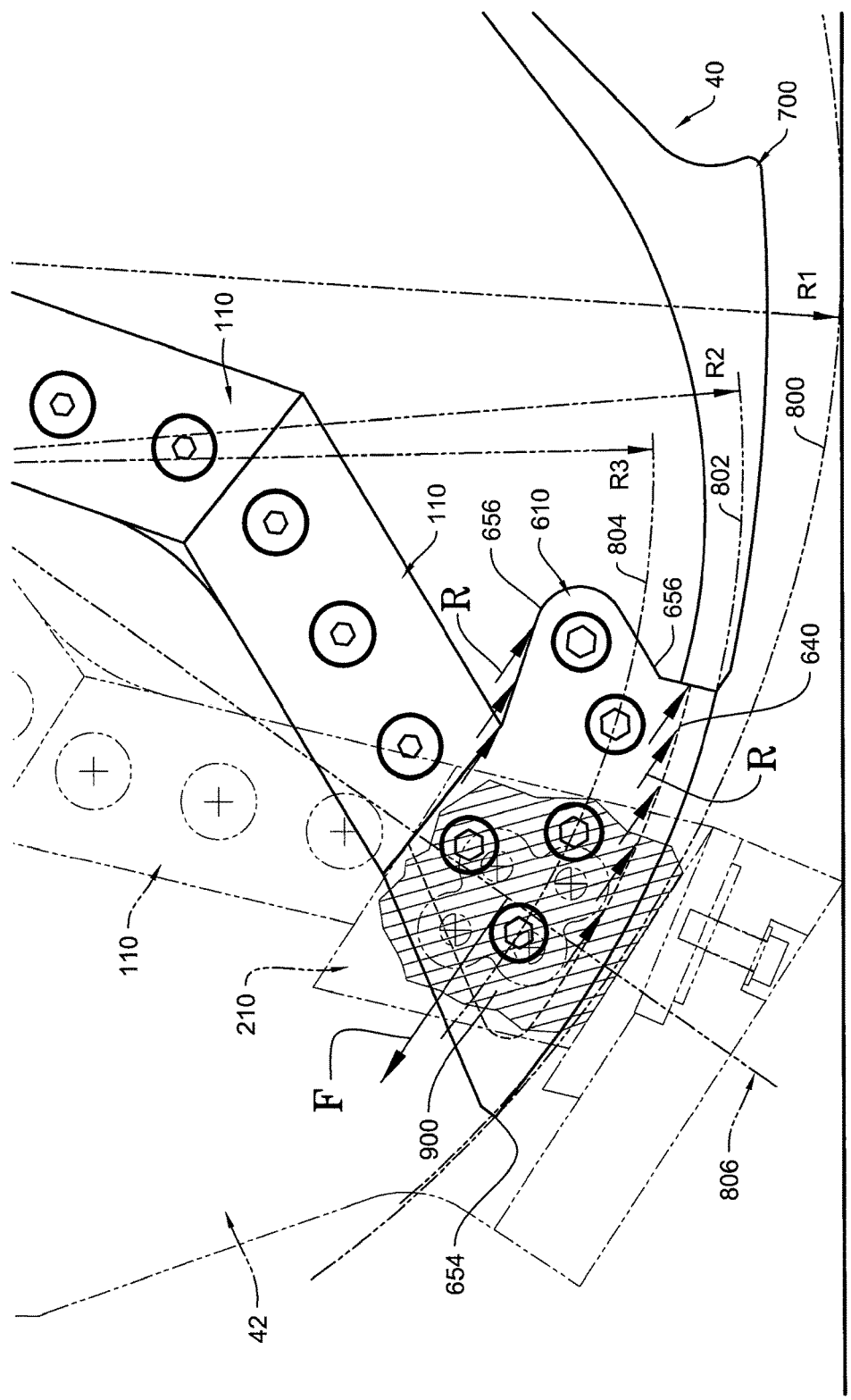
FIG. 22 is an enlarged side elevation view of the upper and lower jaw illustrating forces acting on the piercing tip in a jamming situation.

Referring to FIG. 22, the lower ear bearing surface 653 is at an angle less than 90 degrees to the radial line 806 and therefore provides a bearing surface designated by arrows R against which the peripheral bearing edge surfaces 656 of the nose seat 600 engage to resist the retract force F. Similarly, the inner bearing surface 640 of the front wall 636 bears against the nose seat 606 as designated by arrows R to resist the retract force F. Thus, the resistance or reactionary forces R will reduce the shearing forces being exerted on the connectors 670 by the retract force F, thereby preventing or minimizing the piercing tip insert 610 from being pulled off the nose or otherwise fracturing.

Furthermore, because the holes 660 in the piercing tip insert 610 are aligned along an arc 804 having a radius R3 which is less than the radius R2 but which is concentric with the nose arc 802, a more uniform load is applied across all of the connectors 670 thereby further reducing the shearing stresses exerted on any one connector or causing stress concentrations which could shear the connectors or cause the piercing tip insert to fracture.

Figure 23:
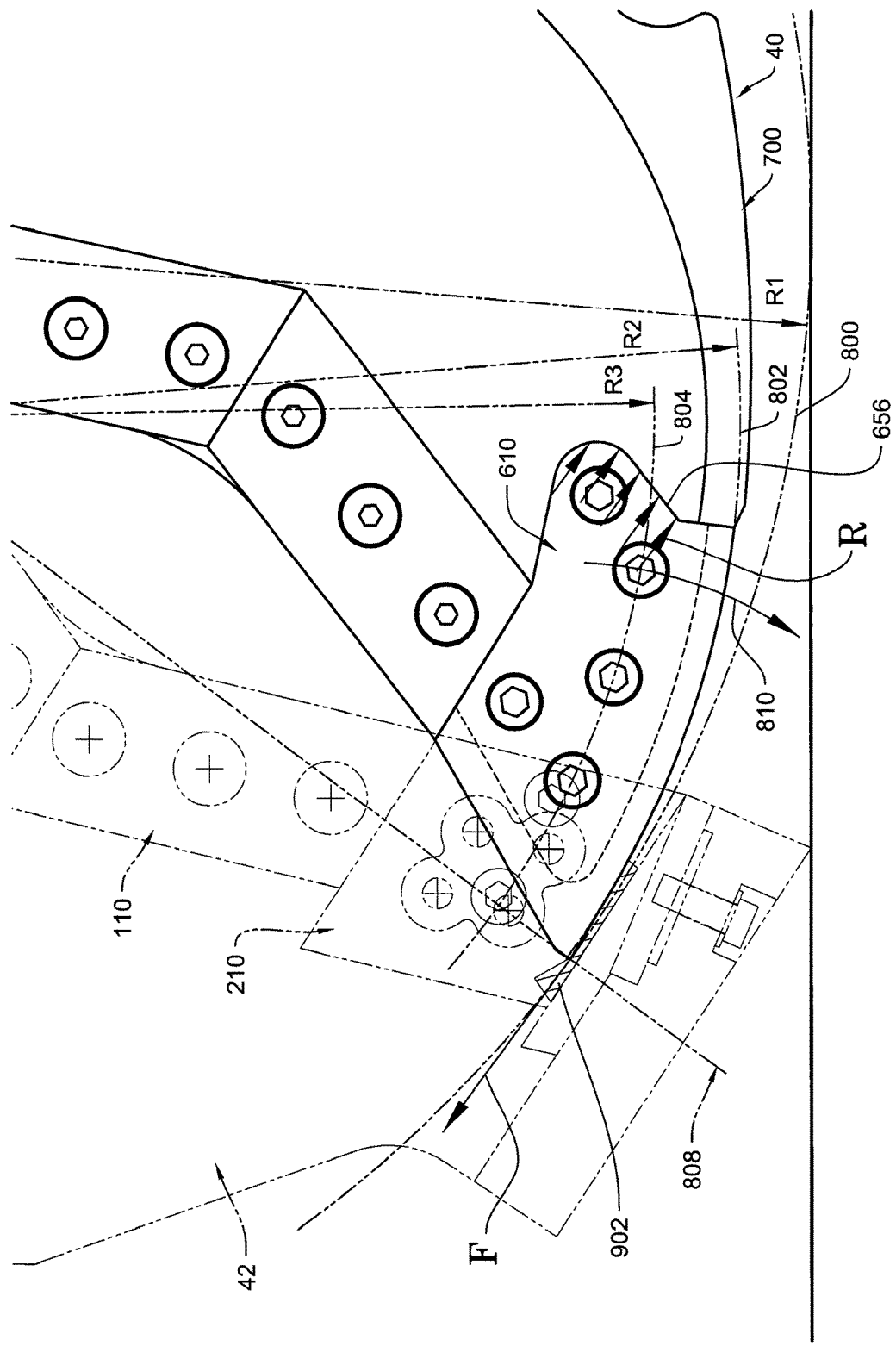
FIG. 23 is an enlarged side elevation view of the upper and lower jaw illustrating forces acting on the piercing tip in another type of jamming situation.

FIG. 23 illustrates another example wherein the hatched area 902 is intended to represent material trapped between the piercing tip insert 610 and the cross-blade insert 410. In this example, the retract force F again pulls the piercing tip in the direction perpendicular to the radial line from 806 extending from the center axis of the jaw pivot shaft 60 to the center point the trapped material, which, in this example, is assumed to be at the piercing tip front edge 654. The retract force F will cause the piercing tip insert 610 to attempt to roll outwardly or away from the nose 601 as indicated by arrow 810. However, the upper ear bearing surface 651 engages with the peripheral bearing edge surfaces 656 of the nose seat 600 as designated by reactionary forces R to resist the outward rotation of the piercing tip insert 610 thereby reducing shearing forces on the connectors 670 and preventing or reducing stress fracturing of the piercing tip insert 610.

Figure 24:
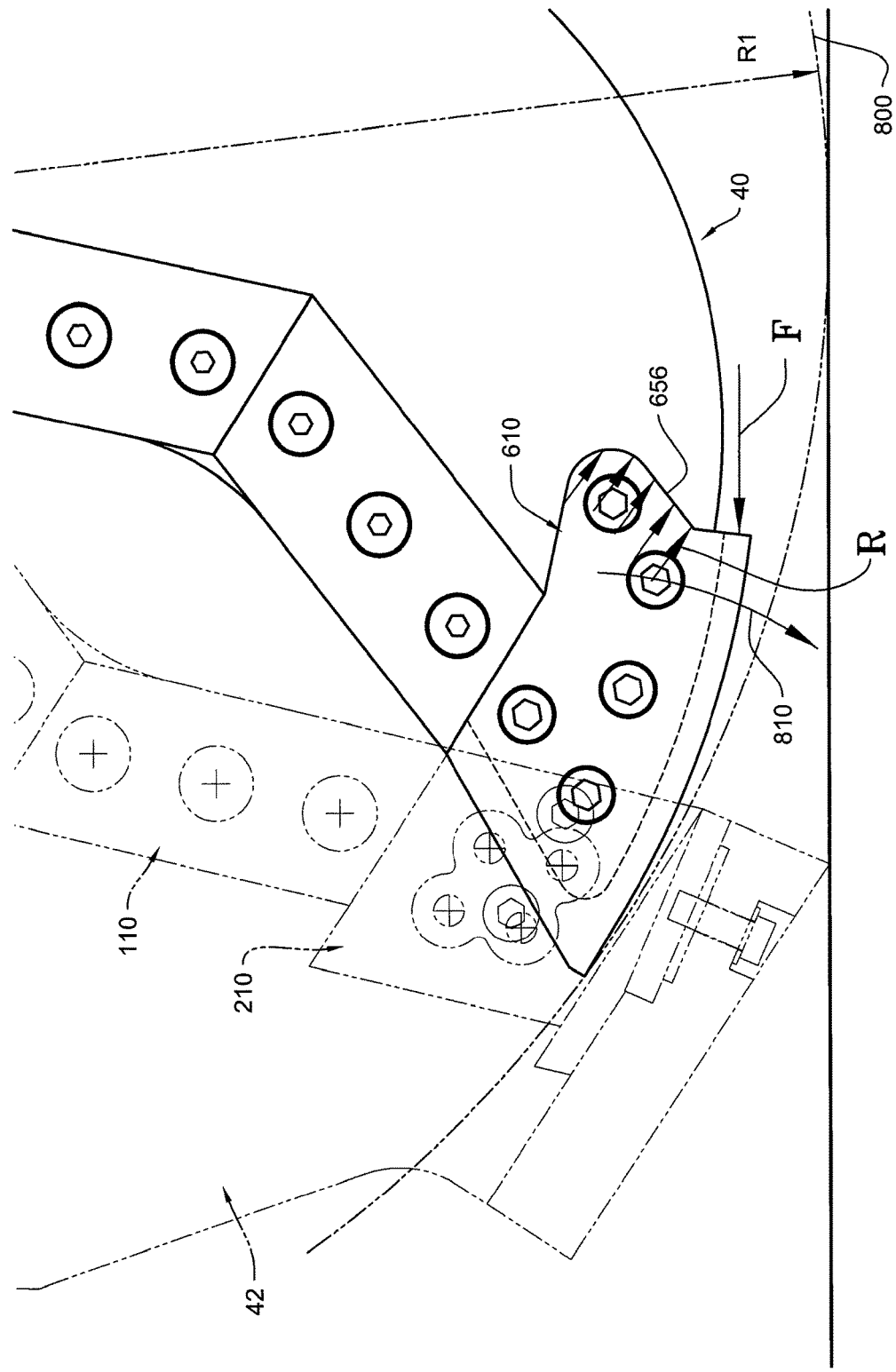
FIG. 24 is an enlarged side elevation view of the upper and lower jaw illustrating forces acting on the piercing tip in the event of snagging of the upper end of the piercing tip due to wear of the parent material from the nose of the upper jaw.

FIG. 24 illustrates an example of the retract force F acting on the upper edge of the piercing tip insert 610 in the unlikely event that the nose 601 is worn down to create a ridge upon which material could snag as described above. Such an occurrence is unlikely in view of the configuration of the nose 601 having a continually increasing distance between the nose arc 802 and the piercing tip front edge arc 800 for the reasons explained above, but nevertheless, if the nose is worn down to create a ridge on which material could snag, the upper ear bearing surface 651 would engage against the peripheral bearing edge surfaces 656 of the nose seat 600 as indicated by reaction forces R to resist the retract force F attempting to roll the piercing tip edge outwardly as indicated by arrow 810 thereby reducing shearing forces on the connectors 670 and preventing or reducing stress fracturing of the piercing tip insert 610.

The foregoing description is presented to enable one of ordinary skill in the art to make and use the invention and is provided in the context of a patent application and its requirements. Various modifications to the embodiments described herein, and the general principles and features of the embodiments described herein will be readily apparent to those of skill in the art. Thus, the present invention is not to be limited to the embodiments described herein and illustrated in the drawing figures, but is to be accorded the widest scope consistent with the spirit and scope of the appended claims.

The invention claimed is:

1. A piercing tip for a demolition shear having an upper jaw, said piercing tip comprising:
   first and second piercing tip halves, each half including:
      an outer sidewall having a planar outer wear surface and a planar inner bearing surface, said outer sidewall further having an ear and a back end bearing surface, said ear having an upper ear bearing surface and a lower ear bearing surface, wherein at least a portion of said lower ear bearing surface transitions angularly away from said back end bearing surface such that said lower ear bearing surface defines a separate bearing plane from said back end bearing surface;
      a curved front wall having an outer curved wear surface defining a front wall arc with a front wall arc radius, said outer curved wear surface extending laterally inward and substantially perpendicular to said planar inner bearing surface of said outer sidewall;
      a bottom leg connected to said curved front wall and having a bottom wear surface extending laterally inward from said planar inner bearing surface of said outer sidewall and substantially perpendicular to said planar outer wear surface of said outer sidewall;
      wherein an intersection of said substantially planar outer wear surface and said bottom wear surface defines a shearing edge and wherein an intersection of said outer curved wear surface and said bottom wear surface defines a front piercing edge.

2. The piercing tip of claim 1, wherein said outer sidewall includes a plurality of connector holes extending through said planar outer wear surface and said planar inner bearing surface, said plurality of connector holes adapted to receive a threaded connector for attaching said piercing tip halves together over a nose seat of the upper jaw of the demolition shear, said connector holes disposed along a connector hole arc concentric with said front wall arc, said connector hole arc having a connector hole arc radius which is less than said front wall arc radius.

3. The piercing tip of claim 1, wherein said piercing tip halves are configured to be attached over a nose portion of said upper jaw of said demolition shear, said nose portion defining a nose seat having peripheral bearing edge surfaces;
   whereby when said piercing tip halves are configured to be attached over said nose portion,
      said planar inner bearing surface of said outer sidewall of said first piercing tip half is configured to bear against a bearing surface on a blade-side of said nose seat and said upper ear bearing surface and said lower ear bearing surface of said outer sidewall are configured to be received by said peripheral bearing edge surfaces on said blade-side of said nose seat;
      said curved front wall of said first piercing tip half is configured to extend over a front first half of said nose seat;
      said bottom leg of said first piercing tip half is configured to extend over a bottom first half of said nose seat;
      said planar inner bearing surface of said outer sidewall of said second piercing tip half is configured to bear against a bearing surface on a guide-side of said nose seat and said ear of said outer sidewall is configured to be received by said peripheral bearing edge surfaces on said guide-side of said nose seat;
said curved front wall of said second piercing tip half is configured to extend over a second front half of said nose seat; and
said bottom leg of said second piercing tip half is configured to extend over a bottom second half of said nose seat.

4. An upper jaw of a demolition shear, comprising:
a jaw body adapted to pivot about a jaw pivot shaft between an open position and a closed position defining a range of motion, said jaw body having a blade-side and a guide-side;
a nose of said jaw body having a nose seat, said nose seat comprising a blade-side nose seat portion, a guide-side nose seat portion, and a front nose seat portion which together define a nose portion with peripheral bearing edge surfaces;
a piercing tip insert removably received over said nose portion, said piercing tip insert comprising a first-piercing tip half and a second piercing tip half, each of said halves comprising:
an outer sidewall having a planar outer wear surface and a planar inner bearing surface, said outer sidewall further having an ear and a back end bearing surface, said ear having an upper ear bearing surface and a lower ear bearing surface, wherein at least a portion of said lower ear bearing surface transitions angularly away from said back end bearing surface such that said lower ear bearing surface defines a separate bearing plane from said back end bearing surface;
a curved front wall having an outer curved wear surface defining a front wall arc with a front wall arc radius, said outer curved wear surface extending laterally inward and substantially perpendicular to said planar inner bearing surface of said outer sidewall;
a bottom leg connected to said curved front wall and having a bottom wear surface extending laterally inward from said planar inner bearing surface of said outer sidewall and substantially perpendicular to said planar outer wear surface of said outer sidewall;
wherein an intersection of said substantially planar outer wear surface and said bottom wear surface defines a shearing edge and wherein an intersection of said outer curved wear surface and said bottom wear surface defines a front piercing edge.

5. The upper jaw of claim 4, wherein as said upper jaw pivots through said range of motion, said front piercing edge defines a piercing edge arc having a radius which is greater than said front wall arc radius such that said front wall arc increasingly transitions away from said piercing edge arc along a length of said front wall arc.

6. The upper jaw of claim 4, wherein said outer sidewall includes a plurality of connector holes extending through said planar outer wear surface and said planar inner bearing surface, said plurality of connector holes adapted to receive a threaded connector for removably attaching said piercing tip halves together over said nose portion of said jaw body, said connector holes disposed along a connector hole arc concentric with said front wall arc, said connector hole arc having a connector hole arc radius which is less than said front wall arc radius.

7. The upper jaw of claim 4, wherein:
said planar inner bearing surface of said outer sidewall of said first piercing tip half bears against a bearing surface of said blade-side nose seat portion and said upper ear bearing surface and said lower ear bearing surface of said outer sidewall of said first piercing tip half is received by said peripheral bearing edge surfaces on said blade-side nose seat portion;
said curved front wall of said first piercing tip half extends over a first half of said front nose seat portion;
said bottom leg of said first piercing tip half extends over a first bottom half of said nose portion;
said planar inner bearing surface of said outer sidewall of said second piercing tip half bears against a bearing surface of said guide-side nose seat portion and said upper ear bearing surface and said lower ear bearing surface of said outer sidewall of said second piercing tip half is received by said peripheral bearing edge surfaces on said guide-side nose seat portion;
said curved front wall of said second piercing tip half extends over a second half of said front nose seat portion;
said bottom leg of said second piercing tip half extends over a second bottom half of said nose portion.

8. The upper jaw of claim 4 further comprising a nose wear shoe having a nose wear shoe arc having a nose wear shoe radius substantially the same as said front wall arc radius such that said nose wear shoe arc increasingly transitions away from said piercing edge arc along a length of said nose wear shoe arc.

9. A piercing tip insert, comprising:
an outer sidewall having a planar outer wear surface and a planar inner bearing surface, said outer sidewall further having an ear and a back end bearing surface, said ear having an upper ear bearing surface and a lower ear bearing surface, wherein at least a portion of said lower ear bearing surface transitions angularly away from said back end bearing surface such that said lower ear bearing surface defines a separate bearing plane from said back end bearing surface;
a curved front wall having an outer curved wear surface defining a front wall arc with a front wall arc radius, said outer curved wear surface extending laterally inward and substantially perpendicular to said planar outer wear surface of said sidewall;
a bottom leg connected to said curved front wall and having a bottom wear surface extending laterally inward from said planar inner bearing surface of said outer sidewall and substantially perpendicular to said planar outer wear surface of said sidewall;
wherein an intersection of said substantially planar outer wear surface and said bottom wear surface defines a shearing edge and wherein an intersection of said outer curved wear surface and said bottom wear surface defines a front piercing edge.

10. The piercing tip insert of claim 9, wherein said outer sidewall includes a plurality of connector holes extending through said planar outer wear surface and said planar inner bearing surface, said plurality of connector holes adapted to receive a threaded connector for attaching said piercing tip insert over a nose seat of an upper jaw of a demolition shear, said connector holes disposed along a connector hole arc concentric with said front wall arc, said connector hole arc having a connector hole arc radius which is less than said front wall arc radius.

11. A blade set for an upper jaw of a demolition shear, said blade set comprising:
at least one shear blade insert adapted to be received in a shear blade seat in a blade-side of the upper jaw; and
a piercing tip insert adapted to be received in a nose seat of the upper jaw, the piercing tip insert comprising:

first and second piercing tip halves, each half including:
an outer sidewall having a planar outer wear surface and a planar inner bearing surface, said outer sidewall further having an ear and a back end bearing surface, said ear having an upper ear bearing surface and a lower ear bearing surface, wherein at least a portion of said lower ear bearing surface transitions angularly away from said back end bearing surface such that said lower ear bearing surface defines a separate bearing plane from said back end bearing surface;
a curved front wall having an outer curved wear surface defining a front wall arc length with a front wall arc radius, said outer curved wear surface extending laterally inward and substantially perpendicular to said planar inner bearing surface of said outer sidewall;
a bottom leg connected to said curved front wall and having a bottom wear surface extending laterally inward from said planar inner bearing surface of said outer sidewall and substantially perpendicular to said planar outer wear surface of said sidewall;
wherein an intersection of said substantially planar outer wear surface and said bottom wear surface defines a shearing edge and wherein an intersection of said outer curved wear surface and said bottom wear surface defines a front piercing edge.

12. The blade set of claim 11, wherein said outer sidewall includes a plurality of connector holes extending through said planar outer wear surface and said planar inner bearing surface, said plurality of connector holes adapted to receive a threaded connector for attaching said piercing tip halves together over said nose seat of an upper jaw of a demolition shear, said connector holes disposed along a connector hole arc concentric with said front wall arc, said connector hole arc having a connector hole arc radius which is less than said front wall arc radius.

13. The blade set of claim 11, whereby when said first and second piercing tip halves are configured to be received in said nose seat,
said planar inner bearing surface of said outer sidewall of said first piercing tip half is configured to bear against a bearing surface on a blade-side of said nose seat of the upper jaw and said upper ear bearing surface and said lower ear bearing surface of said outer sidewall are configured to be received by peripheral bearing edge surfaces on a blade-side of said nose seat;
said curved front wall of said first piercing tip half is configured to extend over a front first half of said nose seat;
said bottom leg of said first piercing tip half is configured to extend over a bottom first half of said nose seat;
said planar inner bearing surface of said outer sidewall of said second piercing tip half is configured to bear against a bearing surface on a guide-side of said nose seat and said ear of said outer sidewall is configured to be received by said peripheral bearing edge surfaces on a guide-side of said nose seat;
said curved front wall of said second piercing tip half is configured to extend over a second front half of said nose seat; and
said bottom leg of said second piercing tip half is configured to extend over a bottom second half of said nose seat.

14. A demolition shear comprising:
a lower jaw;
an upper jaw pivotally connected to said lower jaw by a jaw pivot shaft, said upper jaw movable with respect to said lower jaw about said jaw pivot shaft between an open position and a closed position defining a range of motion, said upper jaw having a blade-side and a guide-side;
a nose of said upper jaw having a nose seat, said nose seat comprising a blade-side nose seat portion, a guide-side nose seat portion, and a front nose seat portion which together define a nose portion with peripheral bearing edge surfaces;
a piercing tip insert removably received over said nose portion, said piercing tip insert comprising a first-piercing tip half and a second piercing tip half, each of said halves comprising:
an outer sidewall having a planar outer wear surface and a planar inner bearing surface, said outer sidewall further having an ear and a back end bearing surface, said ear having an upper ear bearing surface and a lower ear bearing surface, wherein at least a portion of said lower ear bearing surface transitions angularly away from said back end bearing surface such that said lower ear bearing surface defines a separate bearing plane from said back end bearing surface;
a curved front wall having an outer curved wear surface defining a front wall arc length with a front wall arc radius, said outer curved wear surface extending laterally inward and substantially perpendicular to said planar inner bearing surface of said outer sidewall;
a bottom leg connected to said curved front wall and having a bottom wear surface extending laterally inward from said planar inner bearing surface of said outer sidewall and substantially perpendicular to said planar outer wear surface of said outer sidewall;
wherein an intersection of said substantially planar outer wear surface and said bottom wear surface defines a shearing edge and wherein an intersection of said outer curved wear surface and said bottom wear surface defines a front piercing edge.

15. The demolition shear of claim 14, wherein as said upper jaw moves through said range of motion, said front piercing edge defines a piercing edge arc having a radius which is greater than said front wall radius such that said front wall arc increasingly transitions away from said piercing edge arc along said front wall arc length.

16. The demolition shear of claim 14, wherein said outer sidewall includes a plurality of connector holes extending through said planar outer wear surface and said planar inner bearing surface, said plurality of connector holes adapted to receive a threaded connector for removably attaching said piercing tip halves together over said nose portion of said upper jaw, said connector holes disposed along a connector hole arc concentric with said front wall arc, said connector hole arc having a connector hole arc radius which is less than said front wall arc radius.

17. The demolition shear of claim 14, wherein:
said planar inner bearing surface of said outer sidewall of said first piercing tip half bears against a bearing surface of said blade-side nose seat portion and said upper ear bearing surface and said lower ear bearing surface of said outer sidewall of said first piercing tip half is received by said peripheral bearing edge surfaces on said blade-side nose seat portion;

said curved front wall of said first piercing tip half extends over a first half of said front nose seat portion;

said bottom leg of said first piercing tip half extends over a first bottom half of said nose portion;

said planar inner bearing surface of said outer sidewall of said second piercing tip half bears against a bearing surface of said guide-side nose seat portion and said upper ear bearing surface and said lower ear bearing surface of said outer sidewall of said second piercing tip half is received by said peripheral bearing edge surfaces on said guide-side nose seat portion;

said curved front wall of said second piercing tip half extends over a second half of said front nose seat portion;

said bottom leg of said second piercing tip half extends over a second bottom half of said nose portion.

18. The demolition shear of claim 14 further comprising a nose wear shoe having a nose wear shoe arc having a nose wear shoe radius substantially the same as said front wall arc and said front wall arc radius such that said nose wear shoe arc increasingly transitions away from said piercing edge arc along a length of said nose wear shoe arc.

\* \* \* \* \*